United States Patent
Farley et al.

(10) Patent No.: US 11,803,196 B2
(45) Date of Patent: Oct. 31, 2023

(54) UNMANNED AERIAL VEHICLES AND CONTROL THEREOF

(71) Applicant: INTERNATIONAL BUSINESS MACHINES CORPORATION, Armonk, NY (US)

(72) Inventors: Adam Michael Farley, Eastleigh (GB); Keira Louise Hopkins, Eastleigh (GB); Alexandra Easton Wishart, London (GB); Andrew Michael Lees, Ferndown (GB); Julian David Williams, Ringwood (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 17/201,530

(22) Filed: Mar. 15, 2021

(65) Prior Publication Data
US 2022/0291700 A1    Sep. 15, 2022

(51) Int. Cl.
*G05D 1/10* (2006.01)
*G05D 1/00* (2006.01)
(Continued)

(52) U.S. Cl.
CPC ........... *G05D 1/104* (2013.01); *B64C 39/024* (2013.01); *G05D 1/0016* (2013.01); *B64U 2101/20* (2023.01)

(58) Field of Classification Search
CPC .... G05D 1/104; G05D 1/0016; B64C 39/024; B64U 2101/20
(Continued)

(56) References Cited

U.S. PATENT DOCUMENTS

| 5,728,965 A | 3/1998 | Fesland et al. |
| 7,239,110 B2 | 7/2007 | Cheng et al. |
| (Continued) |

FOREIGN PATENT DOCUMENTS

| CN | 207658057 U | * | 7/2018 | |
| CN | 109407458 A | * | 3/2019 | ............. B64F 1/125 |
| (Continued) |

OTHER PUBLICATIONS

Mell, Peter, et al., "The NIST Definition of Cloud Computing", NIST Special Publication 800-145, Sep. 2011, Gaithersburg, MD, 7 pgs.
(Continued)

*Primary Examiner* — Marc Burgess
*Assistant Examiner* — Merritt E Levy
(74) *Attorney, Agent, or Firm* — Rakesh Roy; Matthew M. Hulihan; Heslin Rothenberg Farley & Mesiti PC

(57) ABSTRACT

Unmanned aerial vehicles (UAVs) and control thereof to assemble into flexible, dynamic structures. A UAV includes a flexible screen retractable between extended and retracted positions, connector(s) for coupling to another UAV that can pull the flexible screen from a retracted position to an extended position, and a coupling portion for coupling to connector(s) of yet another UAV to connect to and extend a flexible screen thereof. Chain(s) of coupled UAVs with extended flexible screens thereof form a structure that can change shape and size based on UAV movement. Local wireless communication with a group control UAV facilitates coordinated positioning and control of a UAV group. A group control UAV with a power supply and an electrical conducting lead can power UAVs of a group while it and they are in-flight, and can perform real-time management of the group UAVs in forming and maintaining a desired shape of the structure.

20 Claims, 13 Drawing Sheets

(51) Int. Cl.
  *B64C 39/02* (2023.01)
  *B64U 101/20* (2023.01)
(58) Field of Classification Search
  USPC .......................................................... 701/3
  See application file for complete search history.

(56) References Cited

U.S. PATENT DOCUMENTS

| | | | | |
|---|---|---|---|---|
| 8,825,225 | B1 * | 9/2014 | Stark | G09F 27/00 |
| | | | | 701/4 |
| 10,303,415 | B1 * | 5/2019 | Ananthanarayanan | |
| | | | | G06F 3/1446 |
| 2004/0030570 | A1 | 2/2004 | Solomon | |
| 2005/0081463 | A1 * | 4/2005 | Allen | E06B 9/90 |
| | | | | 52/204.1 |
| 2014/0061377 | A1 * | 3/2014 | Smith | B64F 1/027 |
| | | | | 244/63 |
| 2014/0236388 | A1 * | 8/2014 | Wong | B64C 27/08 |
| | | | | 244/17.23 |
| 2015/0266277 | A1 * | 9/2015 | Ishimoto | B29C 48/08 |
| | | | | 264/210.1 |
| 2016/0140851 | A1 | 5/2016 | Levy et al. | |
| 2016/0351089 | A1 * | 12/2016 | Salem | G05D 1/104 |
| 2017/0024929 | A1 | 1/2017 | Priest | |
| 2017/0123418 | A1 | 5/2017 | Erickson et al. | |
| 2017/0137125 | A1 * | 5/2017 | Kales | B64C 27/10 |
| 2017/0166325 | A1 * | 6/2017 | Gao | G03B 21/14 |
| 2018/0272527 | A1 * | 9/2018 | Cheng | A62C 27/00 |
| 2018/0359603 | A1 * | 12/2018 | Rouphael | H04L 65/762 |
| 2019/0016475 | A1 * | 1/2019 | Zhong | G01C 21/387 |
| 2019/0185162 | A1 | 6/2019 | Prager et al. | |
| 2021/0075295 | A1 * | 3/2021 | Luo | H02K 7/14 |

FOREIGN PATENT DOCUMENTS

| | | | | |
|---|---|---|---|---|
| CN | 112009671 | A * | 12/2020 | |
| CN | 112398986 | A * | 2/2021 | .......... H04M 1/0237 |
| EP | 3816763 | A1 * | 5/2021 | .............. F16C 11/04 |
| KR | 2021023609 | A * | 3/2021 | |
| WO | WO-2016134193 | A1 * | 8/2016 | ............. B64C 37/02 |
| WO | WO-2017172932 | A1 * | 10/2017 | .......... B64C 39/022 |
| WO | WO-2020067924 | A1 * | 4/2020 | |

OTHER PUBLICATIONS

Sullivan, C.C., et al., "Robots, drones, and printed buildings", Feb. 14, 2014. Retrieved on Jan. 6, 2021 from the Internet URL: <https://www.bdcnetwork.com/robots-drones-and-printed-buildings-promise-automated-construction>, 16 pgs.

Hobson, B., "Drones can 'collaborate to build architectural structures'", Mar. 3, 2015. Retrieved on Jan. 6, 2021 from the Internet URL: <https://www.dezeen.com/2015/03/03/movie-drones-building-architecture-ammar-mirjan-gramazio-kohler/>, 13 pgs.

Wikipedia, "Flexible Display" Retrieved on Jan. 6, 2021 from the Internet URL: <https://en.wikipedia.org/wiki/Rollable_display>, 14 pgs.

Mok, K., "These Modular Drones Self-Assemble To Build Cooperative Structures in Mid-Air", Mar. 15, 2018. Retrieved on Jan. 6, 2021 from the Internet URL: <https://thenewstack.io/modular-drones-self-assemble-build-cooperative-structures-mid-air/>, 14 pgs.

Ackerman, E., "Foldable Drone Changes Its Shape in Mid-Air", Dec. 13, 2018. Retrieved on Jan. 6, 2021 from the Internet URL: <https://spectrum.ieee.org/automaton/robotics/drones/foldable-drone-changes-its-shape-in-mid-air>, 3 pgs.

"Flying Screens—The Thinnest and Lightest Flexible LED Screen", retrieved on Jan. 6, 2021 from the Internet URL: <https://www.flyingscreens.tv/#whatis>, 9 pgs.

Steven, "Concrete Spraying Drone", PlanSwift, Jun. 28, 2019. Retrieved on Jan. 6, 2021 from the Internet URL: <https://www.planswift.com/blog/concrete-spraying-drone/>, 6 pgs.

Mok, K., "Modular Structure Adapts Itself Autonomously Using Drone 'Builders'", Nov. 22, 2018. Retrieved on Jan. 6, 2021 from the Internet URL: <https://thenewstack.io/modular-structure-adapts-itself-autonomously-using-drone-builders/>, 19 pgs.

* cited by examiner

UNMANNED AERIAL VEHICLES AND CONTROL THEREOF

BACKGROUND

A UAV is also commonly referred to as a "drone". An unmanned aerial vehicle (UAV), commonly referred to as a drone, is generally an aerial, fully or semi-autonomous, pilotless air vehicle. Flight of the UAV is typically controlled either autonomously by onboard and/or remote computer(s), or by the remote control of a pilot on the ground or in another vehicle. UAVs are increasingly being used to assist operators in activities such as videography, surveying, and traffic analysis, among others.

SUMMARY

Shortcomings of the prior art are overcome and additional advantages are provided through the provision of an unmanned aerial vehicle (UAV) that includes a flexible screen coupled to a retraction device. The flexible screen is retractable, by the retraction device, from an extended position, in which the flexible screen extends in a direction from the UAV, to a retracted position. The UAV also includes connector(s) at a free end of the flexible screen, the connector(s) configured for coupling to a first UAV of a ground of UAVs to move the flexible screen from the retracted position to the extended position based on relative movement between the UAV and the first UAV. The UAV additionally includes a coupling portion configured for engaging with at least one connector of a second UAV of the group. Additionally, the UAV includes a wireless network interface controller for local wireless network communication between the UAV and other UAVs of the group. The UAV also includes a processing circuit in communication with a memory. The memory stores program instructions for execution by the processing circuit to control operation of the UAV to perform wirelessly communicating with one or more other UAVs in the group to facilitate coordinated positioning of the UAV within the group and coupling of the UAV to the first UAV and the second UAV.

In another embodiment, a UAV includes a power supply and an electrical conducting lead for powering one or more UAVs of a group of UAVs in-flight. The UAV also includes a global positioning satellite (GPS) receiver and at least one communication device, including a wireless network interface card. Additionally, the UAV includes a processing circuit in communication with a memory. The memory stores program instructions for execution by the processing circuit to control operation of the UAV to perform a method. The method includes receiving, from an external server, instructions for formation of a structure out of the UAVs of the group at a geographic location. The method also includes navigating to the geographic location based on GPS data obtained from the GPS receiver. The method additionally includes establishing, using the wireless network interface card, a local wireless network at the geographic location for wireless network communication between the UAV and the UAVs of the group. Yet further, the method includes performing real-time management of the UAVs of the group in forming and maintaining a desired shape of the structure at the geographic location. The real-time management includes wirelessly communicating with the UAVs of the group in providing control commands to the UAVs of the group to coordinate positioning and coupling together of the UAVs of the group in forming and maintaining the desired shape. The coupling together includes selective coupling of, and relative movement between, a plurality of the UAVs to extend flexible screens of the plurality of UAVs to form at least a portion of the structure.

Yet further, a computer-implemented method includes receiving, by a group control unmanned aerial vehicle (UAV), from an external server, instructions for formation of a structure out of group UAVs at a geographic location. The method also includes navigating to the geographic location based on GPS data obtained from a global positioning satellite (GPS) receiver of the group control UAV. The method additionally includes establishing, using a wireless network interface card of the group control UAV, a local wireless network at the geographic location for wireless network communication between the group control UAV and the group UAVs. In addition, the method includes performing real-time management of the group UAVs in forming and maintaining a desired shape of the structure at the geographic location. The real-time management includes wirelessly communicating with the group UAVs in providing control commands to the group UAVs to coordinate positioning and coupling together of the group UAVs in forming and maintaining the desired shape. The coupling together includes selective coupling of, and relative movement between, a plurality of the group UAVs to extend flexible screens of the plurality of group UAVs to form at least a portion of the structure.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
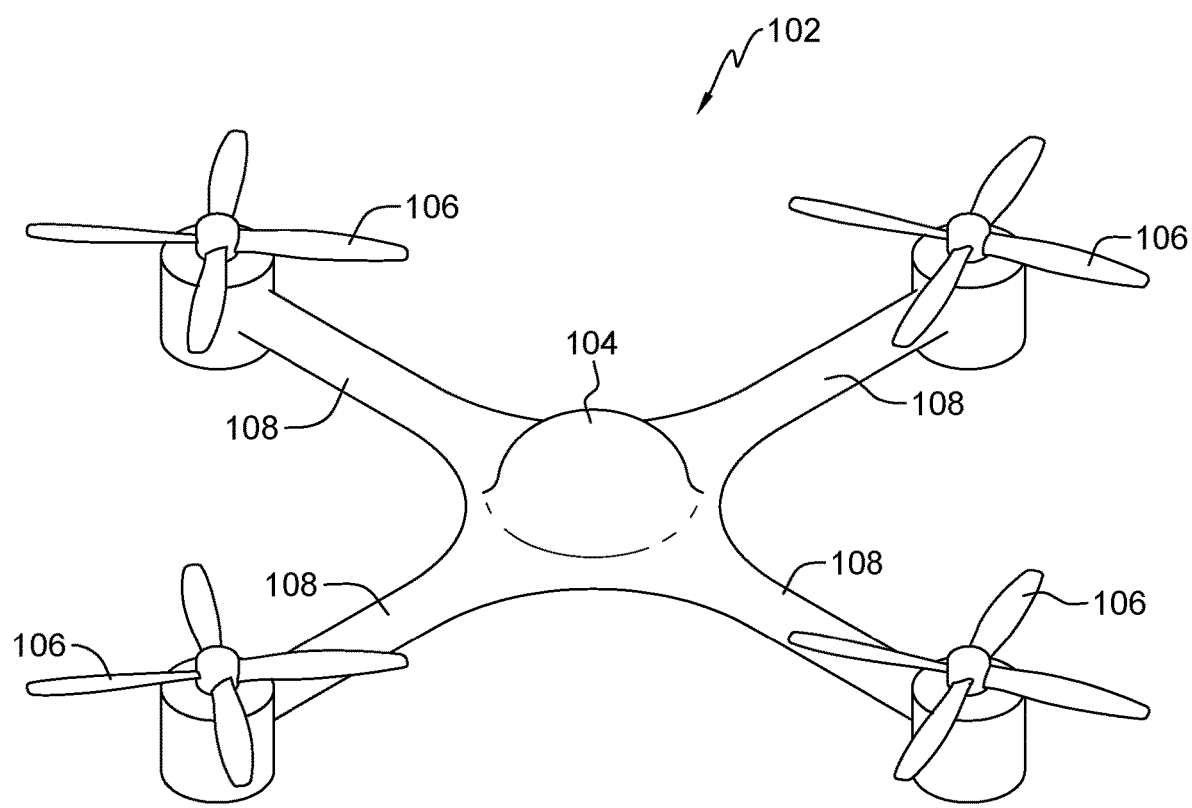
FIG. 1 depicts an example of an unmanned aerial vehicle.

Described herein are approaches and related devices for providing surfaces that assemble into two-dimensional and/or three-dimensional structures and that can dynamically setup, break-down, and reshape. Such adaptations are based in some instances on current environmental conditions, current needs, and desires. In some examples, the surfaces are display-enabled surfaces capable of displaying digital images and other graphical elements.

A problem is that most physical structures, large and small, are constructed to be static in size and shape, with surfaces, openings, and other characteristics being planned and constructed with the intent that they remain as-is for the foreseeable future. They are generally not reconfigurable without significant work to deconstruct and then differently reconstruct them. They also cannot relocate where needed, under their own power, and on short notice. When presenting an advertisement or other information, one either leverages a medium that is already present at a targeted location (television, speaker, billboard, etc.) or relies on users carrying their own mediums (phones, tablets, etc.). In addition, the scale of a physical advertisement, whatever the medium, is limited to a size of the medium and cannot expand beyond its limits without installation of a larger area, poster, screen, surface, or the like. This takes time and effort, and is an inconvenience.

To help exemplify these points, take an example scenario in which a change of focus necessitates that a static advertisement or other display of information is to be changed or modified. Conventional practice provides no good option because of the resources necessary to replace the static item with a different one. However, aspects described herein provide a fluid, on-demand, and mobile solution that is useful in this situation.

In another example scenario, a company requires additional physical space, perhaps on a temporary basis, but wants to avoid building a new conventional building or renting an existing space because it may not be located where the company requires it to be. This situation could be addressed with a building or other structure that is of dynamic, bespoke size and form, capable of expanding and shrinking to accommodate the needs of the company. For instance, the structure might be to house or cover objects such as equipment, inventory, or people, and do so in a manner that can morph and adapt its structural properties over time to environmental conditions (such as the weather and/or temperature) and requirements for adding, removing, reshaping, or resizing surfaces, like walls, and openings, based on needs.

In the above scenario of a static and inflexible advertisement, a solution is provided herein that is based on what is needed, where it is needed, and when it is needed, and the solution can be scaled up or down in size and can adapt quickly based on requirements. When the advertisement (or other structure, such as a physical space as in the other example above) is no longer needed, it can be rapidly removed in relatively little time. In some cases, it can be removed in just minutes by the UAVs retracting their screens and flying away.

Conventional solutions this adaptable and dynamic do not exist. Some approaches for buildings and physical structures provide limited reforming ability based on pivot points, smart systems, and modular design but these are based on static structures that must be built and then have intelligence added to the building afterward. The individual elements of the building are not independently mobile before, during, and after structure formation, and the structure can only reform to a limited degree and along predefined lines.

Some approaches use automated means, such as unmanned aerial vehicles (UAVs), in aiding assembly of a static structure out of non-mobile blocks but the resulting structure is no less static than a structure conventionally built by hand; any UAV involved is an aid to the construction of a static structure itself, which does not incorporate the UAV. The resulting structure, whether modular or not, is static with only limited or no ways in which it could be re-structured or pivoted.

As noted, a UAV is generally an aerial, fully or semi-autonomous, pilotless air vehicle. FIG. 1 depicts an example of an unmanned aerial vehicle. The UAV 102 includes a housing unit 104 and movement mechanisms 106 (four rotors/propellers in this example). In FIG. 1, the four rotors 106 are positioned at the ends of respective arms 108. A UAV with four rotors is commonly referred to as a quadcopter. The housing unit 104 houses one or more motors, among other hardware, that drive rotation of the movement mechanisms 106. This rotation causes the UAV to perform desired aerial movements in three-dimensional space, including lifting off and away from a location, steering, turning, rotating, and the like. The housing unit 104 can enclose various additional components not pictured, most notably a battery or other power supply, a processing circuit, and memory that stores program instructions for execution by the processing circuit to perform functions and cause the UAV to perform functions. These functions include controlling operation of the UAV. Often the internal hardware providing such on-device control is referred to as a controller of the UAV. The controller could receive commands from a remote device that may also be referred to as a controller. The power supply of a UAV provides power to various components of the UAV, including to the processing circuit and motor(s). UAV 102 can include further elements not depicted or described with reference to FIG. 1. Example elements include camera(s), sensor(s), transmitter(s)/receiver(s), and other input/output devices. A movement mechanism in this example is a single rotor/propeller, though other movement mechanisms, such as a propulsion mechanism or similarly-functioning devices, are possible.

Figure 2:
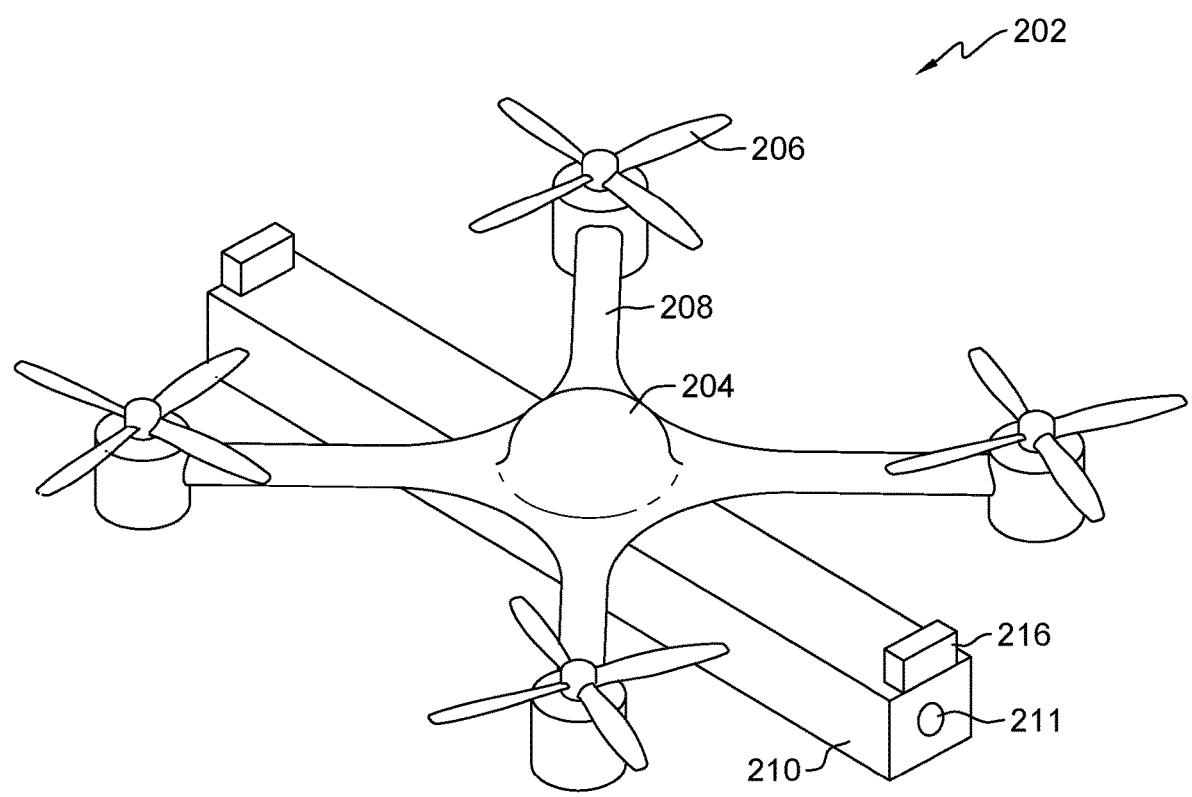
FIG. 2 depicts an example embodiment of an unmanned aerial vehicle in accordance with aspects described herein.

Aspects described herein leverage UAV technology in providing flexible structures. In some aspects, UAVs carry flexible screens or other surfaces to be used in at least partially forming and assembling into dynamic structures. FIG. 2 depicts an example embodiment of an unmanned aerial vehicle in accordance with aspects described herein. Like in FIG. 1, the UAV 202 includes a housing 204 and rotors 206 disposed proximate the ends of arms 208. The UAV 202 also includes a housing 210 containing a rolled flexible screen (not depicted in FIG. 2). The flexible screen is coupled to a retraction device, for instance a spring-loaded or motor-driven central axle 211, extending the length of the housing 210 and around which the flexible screen rolls. The axle 211 can rotate to unfurl the flexible screen. In this manner, the flexible screen can be retractable/extendable between a fully extended position (e.g. completely unrolled) and a fully retracted position (e.g. completely rolled), and anywhere in between. As described herein, the flexible screen could be pulled downward (relative to the view of FIG. 2) to unroll and extend the flexible screen from housing 210. Upon release of the screen, the screen could retract back into the housing 210 and again into the rolled position. Even in the rolled position, a free end of the screen may extend outside of housing 210, though in other examples the screen when rolled is fully contained with housing 210.

Figure 3:
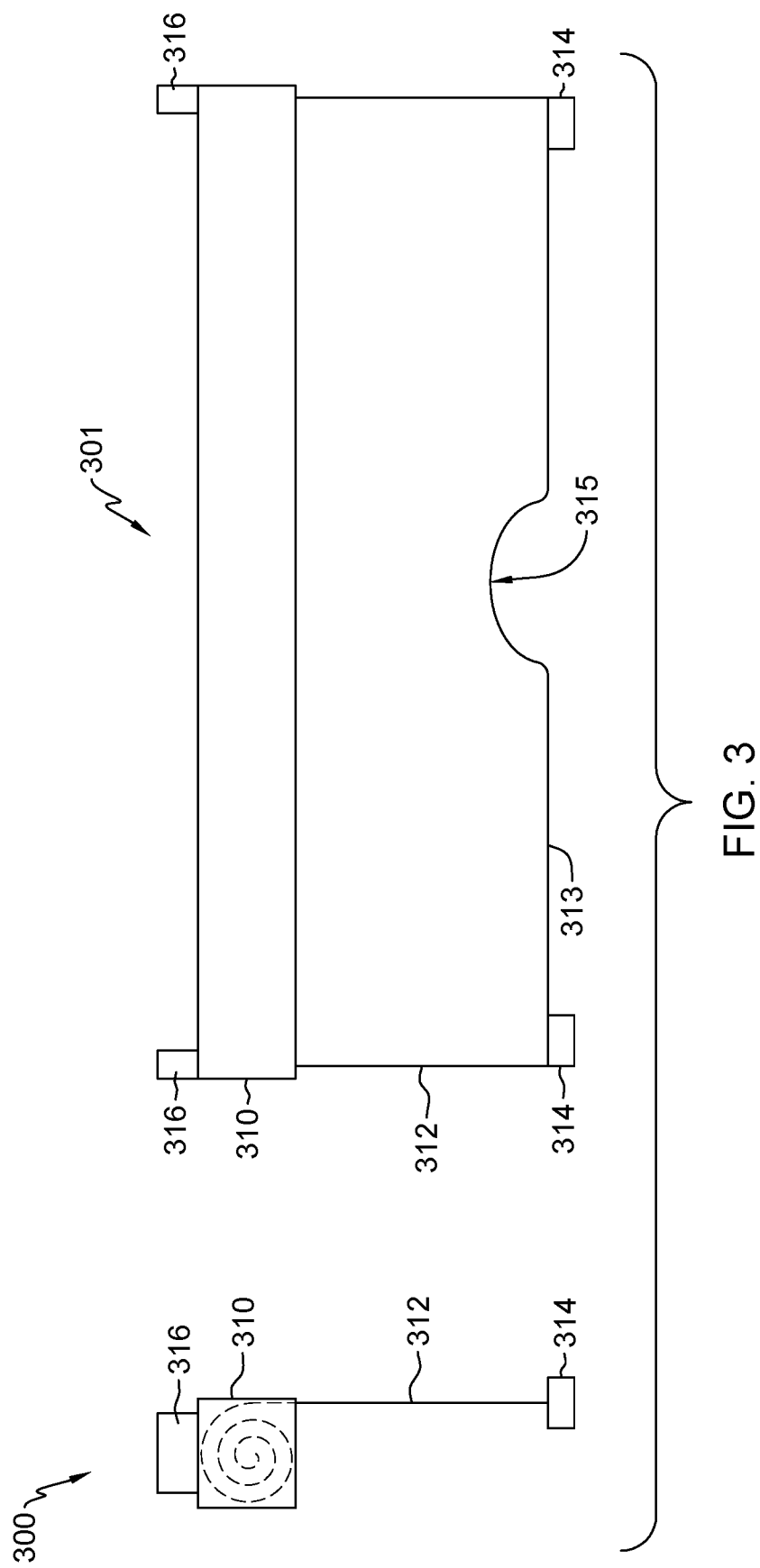
FIG. 3 depicts an example embodiment of a flexible screen and housing in accordance with aspects described herein.

Further details of a flexible screen and housing in accordance with aspects described herein are provided with reference to FIG. 3. FIG. 3 shows a screen housing and flexible screen from a side view 300 and a front view 301. Flexible screen 312 is partially unfurled/unrolled in this example, with a portion thereof remaining rolled/coiled within housing 310 and another portion thereof exposed, having been extended from housing 310. At/on a free end 313 of flexible screen 312 are connectors 314. The connectors are configured to couple to another UAV as described herein, for instance to attach to the other UAV such that the screen 312 can be pulled (e.g. downward in this view) from housing 310 to unroll the screen. Similarly, coupling portions 316 (216 in FIG. 2) on the top of housing 310 could engage with connectors on the free end of a flexible screen of yet another UAV such that the flexible screen of that other UAV can also be extended. Though connectors and coupling portions could be any kind of connectors suitable for temporarily, physically coupling together with enough strength to enable one UAV to pull and extend a flexible screen of another UAV from its screen housing, in one specific example the connectors and coupling portions are magnets or ferromagnetic material such that UAVs magnetically couple together and can move apart to extend their screens.

Figure 4:
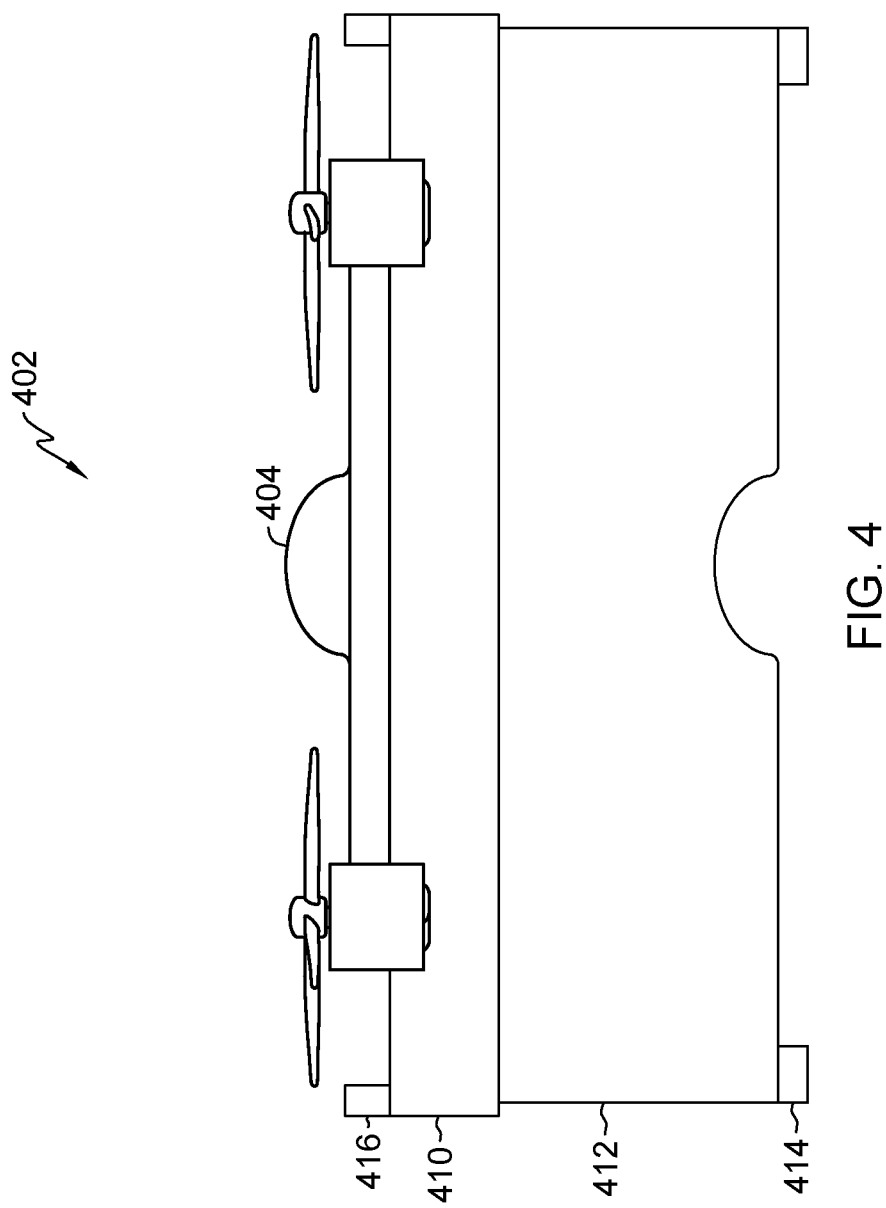
FIG. 4 depicts an example front view of an embodiment of an unmanned aerial vehicle in accordance with aspects described herein.

FIG. 4 depicts an example front view of an embodiment of an unmanned aerial vehicle in accordance with aspects described herein. The flexible screen 412 of UAV 402 is at least partially extended (e.g. unrolled, unfurled) in this example. As in FIGS. 2 and 3, UAV 402 includes a UAV housing unit 404 to which is attached a housing 410 to house the flexible screen 412. Magnets (or other connectors) 414 sit at a free end of the flexible screen for coupling to another UAV, for instance coupling portion(s) of that other UAV. Magnets 416 sit atop the housing 410 as a coupling portion of UAV 402 for coupling to the connector(s) (e.g. magnets) at an end of another flexible screen of a different UAV.

Extended screens can form walls, ceilings, or any other desired type of surface and structure therefrom. The movement, arrangement, and coupling of a group of UAVs (sometimes referred to as a "swarm" of UAVs), together with the extension of flexible screens thereof, can create desired shapes such as coverings or other types of structures. Since UAVs can remain substantially stationary (hover) in air, this allows for gravity-defying shapes and rapid, dynamic reformation. When the structure is no longer needed, the UAVs can disengage from each other and fly to a desired destination, such as a home base, depot, or docking station. In some examples, the flexible screens are electronic visual displays for displaying graphical elements and digital content, for instance digital advertisements or virtual reality environments. In this regard, the structure could be or include dynamically-extended two-dimensional surface(s) for displaying desired content.

Thus, in embodiments, a structure, such as a covering (flexible building, canopy, etc.) to cover an object, or other type of structure, is formed of flexible screens of UAVs in a group. Some such structures can provide dynamic advertising, on-demand virtual reality environments, and more, as instructed by a cloud computer and optionally via a group (swarm) control UAV as described elsewhere herein.

A flexible covering or structure as described herein may not require upkeep or maintenance and could travel to any desired location, such as to the location of any objects to be covered by or housed in such a structure. In some aspects, the UAVs forming a structure can adapt to environmental conditions posed by nature or objects in the environment. They can, for instance, maneuver to modify the structure, such as to create, remove, move, or resize surfaces and/or openings. In a particular example, the UAVs maneuver to prevent collisions with objects, such as those that enter, exit, or reposition within the structure. The structure could regulate temperature and exposure to weather conditions by increasing the spaces between chains of UAVs or implementing multiple layers, thicker screens, etc., as examples.

The structure, its formation, and its dynamic adaptation as needed can be controlled by the cloud (possibly via a group control UAV local to the structure), which imparts to the group and structure an intelligence as smart as the cloud server(s) that control the group. UAVs as described herein provide for agile structures while being more efficient in terms of land usage because static dedicated paths, fire assembly points, and the like are not required as they can be dynamically defined and provided.

Thus, described herein are approaches and related physical apparatuses for temporary structures and surfaces constructed of UAVs. The UAVs can coordinate in unison to form desired structures. Surfaces can be flexible screens made of materials appropriate for any of varying applications. They may be laminated/waterproof, for instance, to withstand wet weather conditions. The surfaces could be flexible electronic visual displays that can display images and other graphical elements. Additionally or alternatively, they may be projector screens onto which a projector can cast images for display.

In some examples, the UAVs carry furled, rollable screens for extension to assemble into dynamic structures, though in other examples the screens are folded and are extended by unfolding them.

Though in some examples all of the UAVs in a group to form a structure are identical in terms of their components, in other examples the UAVs can differ. For instance, different UAVs could have flexible screens of differing properties (size, shape, material, curvature, etc.). Some UAVs could carry flexible screens suitable for particular types of surfaces (such as straight vertical surfaces) while and some UAVs could carry flexible screens suitable for other types of surfaces (such as screens that are adapted with or for curvature to form curved or slanted horizontal surfaces). A dynamic structure may be a formation of UAVs (a group) that assemble into chains and fly and/or hover in a coordinated formation, creating a semi-enclosed or fully-enclosed space. The structure can then be re-configured simply by changing the formation of the group.

The flexible screens remain attached to the UAVs after they arrange into a correct formation. The UAVs can alter their position within the structure dynamically in response to proximity, size, or number of objects contained in or covered by the structure, and/or other environmental conditions like rain or changing temperatures. When the structure is no longer needed, the UAVs can disengage from each other and fly away.

Figure 5:
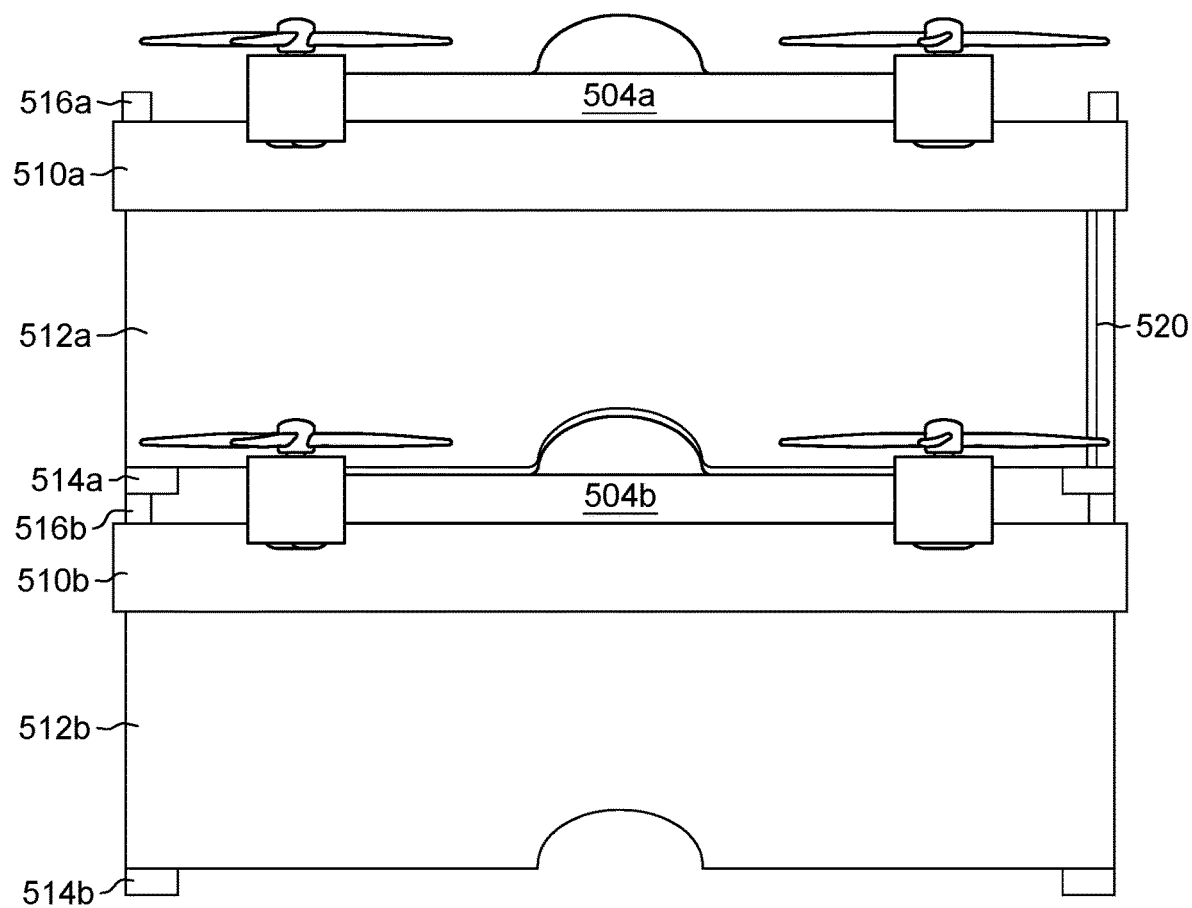
FIG. 5 depicts an example of two unmanned aerial vehicles coupled in accordance with aspects described herein.

FIG. 5 depicts an example of two unmanned aerial vehicles coupled in accordance with aspects described herein. FIG. 5 illustrates example physical engagement between two UAVs 504a and 504b. UAVs 504a and 504b have positioned themselves such that 504a sits above 504b. Connectors 514a are ferrous material, such as magnets, affixed to a bottom end of screen 512a and have magnetically engaged with magnets 516b of UAV 504b. Magnets 516b are affixed to screen housing 510b, which contains flexible screen 512b of UAV 504b. The magnetic coupling of the end of screen 512a (via magnets 514a) to the fixed magnets 516b provides enough attraction that when one or both of UAVs 504a, 504b move away from the other, screen 512a is unrolled and extended from housing 510a. Thus, this could result from UAV 504a flying upward, UAV 504b flying downward, or a combination of the two. Screen 512a of UAV 504a is partially unfurled from housing 510a in this example and, depending on its length, may be pulled out and extended much further from housing 510a. The extension of the screen increases exposed surface area of the screen. The flexible screens are of finite length and separation between adjoined UAVs can be controlled so that they remain attached to each other.

Coupling magnets 516b are electromagnets in some embodiments. UAV 504b can turn them off to break the magnetic attraction with connectors 514a. Additionally or alternatively, connectors 514a are electromagnets selectively energized by UAV 504a to break the magnetic attraction with coupling portions 516b.

The axle to which flexible screen 512a is attached in housing 510a may be biased using a spring or other device, and thus can pull the screen 512a into the rolled position in housing 510a when the screen is detached from UAV 504b.

It is also seen from FIGS. 3-5 that the free end (e.g. 313 of FIG. 3) of the flexible screen has a contour that conforms to a shape of an adjoining UAV, i.e. where the free end is positioned when the connectors of the UAV are coupled to the adjoining UAV. For instance, FIG. 3 shows a cut-out 315 substantially matching the size and shape of the top of another UAV that can attach to UAV 302, and this arrangement is shown in FIG. 5 where the flexible screen 512a of UAV 504a follows the contour of the top of UAV 504b when the two UAVs are coupled as shown.

Though FIG. 5 depicts just two UAVs coupled to each other, these may be part of a much larger chain of coupled UAVs. Flexible screen 512b of UAV 504b may be similarly extended based on connectors 514b coupling to another UAV (not pictured) to pull and unroll screen 512b from housing 510b in a similar fashion, and the coupling portions 516a of UAV 504a may engage with connectors on another UAV (not pictured) to extend the flexible screen thereof. A chain of any number of UAVs may form to assemble a substantially continuous surface of any length.

In addition, the UAVs can each incorporate an electrical conductor, such as a copper wire, that extends along the flexible screen for transferring power between coupled UAVs. In FIG. 5, copper wire 520 extends along flexible screen 512a. The copper wire 520 may be embedded within, or mounted along, flexible screen 512a and extend/retract with flexible screen 512a. The electrical conductor 520 can be coupled to the battery/power supply of UAV 504a and a contact at the free end of the flexible screen 512a. The contact can electrically couple to a contact of UAV 504b for conducting electricity between UAVs 504a and 504B. Each UAV can have an electrical conductor and the UAVs can therefore link together the batteries/power supplies of the UAVs in the formation, allowing all UAVs in a chain to share power. Additional power can be supplied by another UAV, for instance a group control UAV that carries a larger battery pack/power supply and can link directly into a main power source where possible, as described herein.

Each UAV can include contacts/conductors that engage with those of other UAVs to pass power through them. One (or more) UAVs in a chain can take power from a group control UAV with a larger power supply and/or the ability to dock at a local power bank or other power source (a "main"). A terrestrial power main could be provided in a fixed position, for instance. The group control UAV can have knowledge of this power main's location and the ability to locate it to make the connection thereto. In some embodiments, these mains can be installed on a temporary or semi-permanent basis at a location at which the structure is to be formed. The group control UAV has an electrical conducting lead that electrically engages with one or more of the UAVs in the group chain.

The group control UAV also includes communication device(s) for connecting to cellular, satellite, or other mobile network connection(s), and to external server(s), the "cloud" to receive instructions as to the formation of a structure by the group UAVs (i.e. those in the swarm) at a geographic location and other instructions. The group control UAV can establish a local wireless network (a Wi-Fi or other protocol-based wireless communication network for example) at the site for wireless communication between the group control UAV and the other UAVs at the site. The group control UAV provides real-time management of the UAVs of the group by issuing control commands or other directions to the UAVs at the site, ensuring they react to proximity and maintain the structural shape and position dictated by the cloud. The link between the UAVs of the site and the cloud can be via the group control UAV and the aforementioned mobile network connection.

As part of the management of the group UAVs, the group control UAV can keep track of the group units using cameras for visual identification, RFID tags and scanning, etc., while monitoring the group UAVs' network connection strengths, power levels, and other properties. The group control UAV can perform real-time management of the group UAVs in both forming and maintaining a desired shape of the structure by wirelessly communicating with the UAVs of the group and providing the control commands thereto in order to coordinate their positioning and coupling to form and maintain the desired shape of the structure, and implement any dynamic changes thereto, for instance to create and close openings or to move and reshape surfaces of the structure. An aspect of the coupling of group UAVs is the selective coupling of, and relative movement between, multiple UAVs in order to extend flexible screens of those UAVs in forming at least a portion of the structure, as described herein.

The group control UAV can perform analytics on whether the structural integrity of the UAVs and the overall structure exists in order to understand properties of the environment and conditions thereof, including changes in the weather and in presences or movement of objects in the environment. The group control UAV can dictate appropriate adjustments to position and movement of the UAVs, thereby changing the structure to open or close portions of the structure based on wind conditions, temperature changes, precipitation, presence and location of objects, and any other changing conditions of the environment. This can all be facilitated and coordinated via an ad hoc wireless network for local communication.

In some embodiments, such control over the group UAVs is provided by the cloud and/or in a decentralized manner and coordinated among the group UAVs themselves, rather than a local group control UAV. In this manner, a group control UAV may not be strictly necessary.

By way of a specific embodiment of an application of these aspects, assume a user desires a structure to be constructed at a location. The user launches a mobile application (or other computer software) that loads an interface through which the user requests a temporary structure, such as a covering, built from group UAVs as described herein. The user interacts with the interface to input characteristics (estimated or actual number and/or size, etc.) of objects to be contained partially or wholly within the structure. The user can select from a variety of different structure shapes and styles according to the user's desires. In this regard, structures of varying size, shape, and other properties may be made available for selection, and optionally for customization, by the user. The different types of structures may vary in characteristics, such as in their numbers and sizes of surfaces, openings, heights, footprints, and any other desired characteristics. The user can also indicate a date and timeframe of need for the structure. The user's input and selected parameters for the structure are provided to cloud server(s), which ascertain the desired location by locating the user leveraging GPS signals from the user's mobile device or by prompting the user to select a location, as examples. The cloud identifies the nearest or otherwise most appropriate UAV depot housing a collection of UAVs. The appropriate number of UAVs—group UAVs and one or more group control UAVs—are dispatched and fly to the desired location. The group control UAV coordinates the formation and maintenance of the structure in the appropriate position and location, optionally with user input. If an object approaches a surface of the structure, UAVs can open (or expand an existing opening) by manipulating the extension of their flexible screens (e.g. upwards, temporarily furling the screens) to permit entry or exit. If the structure is to accommodate larger or additional objects, additional UAVs can be dispatched to expand the structure. Similarly, UAVs can be removed and the structure contracted if the size of the structure is to be reduced. Based on a determination that the structure is empty, or on the requesting user selecting a command using the software, the UAVs disperse and return to the UAV depot.

The group UAVs, specifically the ones that physically make up the structure, can thus each include one or more flexible screens that may be extended and retracted. They can also include electrical conductor(s) attached to electrical contacts for engaging with other UAVs such that power can be transferred between them. Connectors and coupling portions made of ferromagnetic material can facilitate on-demand, physical coupling together of the UAVs. The connectors can be selectively engageable such that the UAVs can attach and detach from each other as desired. When two UAVs are attached, relative movement of the UAVs to move apart can cause the flexible screen of one UAV, coupled to the other UAV, to be extended, unfurled, unrolled, unfolded, or the like such that the flexible screen forms a surface that extends between the UAVs. This can be repeated among many UAVs in a group to form one or more structures. In some examples, the structure is not entirely physically contiguous, in that UAVs could hover such that surfaces overlap other surfaces to form a structure but with gaps, albeit relatively small ones, between the constituent parts.

The UAVs can additionally include sensors and other input/output devices, for instance proximity sensor(s), accelerometer(s), camera(s), GPS radio(s), active or passive radio-frequency identification (RFID) tag(s) and/or other proximity-based identification hardware, thermometer(s), hygrometer(s), smoke and/or gas detector(s), ambient light sensor(s), and/or any other desired hardware. Group control UAVs can additionally or alternatively include multi-UAV transceiver(s) for communicating with other UAVs, RFID scanner(s)/interrogator(s), near-field communication hardware, and/or mobile phone(s)/communication/positioning hardware for GPS navigation and communicating with the cloud. Additionally, a group control UAV can include a heavy-duty power pack that can be charged at a depot and/or on-site and used to recharge the group UAV via an interlinked electrical distribution framework. The group control UAV can include a power socket, prong/electrical lead for recharging UAVs, and/or a power cable to facilitate charging the group control UAV and/or group UAVs.

As depicted in FIGS. 2-5, an example individual UAV may be a quadcopter-style UAV. The quadcopter includes circuit(s) connected to the UAV's rotor motors, battery, transceiver(s), proximity sensor(s), and/or other hardware of the UAV. In examples, this circuit can include a controller (e.g. processing circuit executing instructions) to control the rotation speed of the blades, accept remote commands from the group control UAV and/or other external device, and transmit any data gathered from a sensor package of the UAV to a group control UAV. The UAV includes an active RFID tag coupled to a power supply dedicated to the active RFID tag. The dedicated power supply can recharge from an internal power supply of the UAV that powers operation of the UAV, including motor rotation and the processing by the processing circuit. In this regard, the active RFID tag may remain powered even if the UAV's main battery is fully drained. This can facilitate locating and retrieving of the UAV in the event that the main battery becomes depleted or the UAV experiences a circuit failure the renders the UAV unable to fly.

The UAV also includes a flexible screen that can be retracted, for instance rolled around an axle inside a box or other housing, and kept rolled by way of a spring or other device. As depicted in the examples of FIGS. 2-5, the screen housing is provided with coupling portion(s), for instance ferromagnetic material, on top, and connectors, for instance magnets or other ferromagnetic material, underneath. The coupling portions on top can magnetically engage with connectors on the bottom, free end of a flexible screen of another UAV to pull the flexible screen thereof, unroll and extend it based on relative movement between the two UAVs. Further, a UAV's flexible screen can have a copper wire along one side, extending from a magnet at the top to a magnet at the bottom, and be configured for conducting power from the UAV to a coupled UAV allowing chains of UAVs to be recharged via an electrical main lead, external battery pack, or a group control UAV's own power supply.

FIGS. 2-5 depict the screen housing mounted underneath a central portion of the UAV's body but in other examples the screen housing is disposed at or proximate an edge or one side of the UAV. The flexible screen housing and connectors on the flexible screen of a counterpart UAV can similarly be moved to an edge thereof, such that the alignment of the screen housings and connectors of the UAVs is maintained to enable magnetic engagement and extension of the flexible screens as described above.

Figure 6:
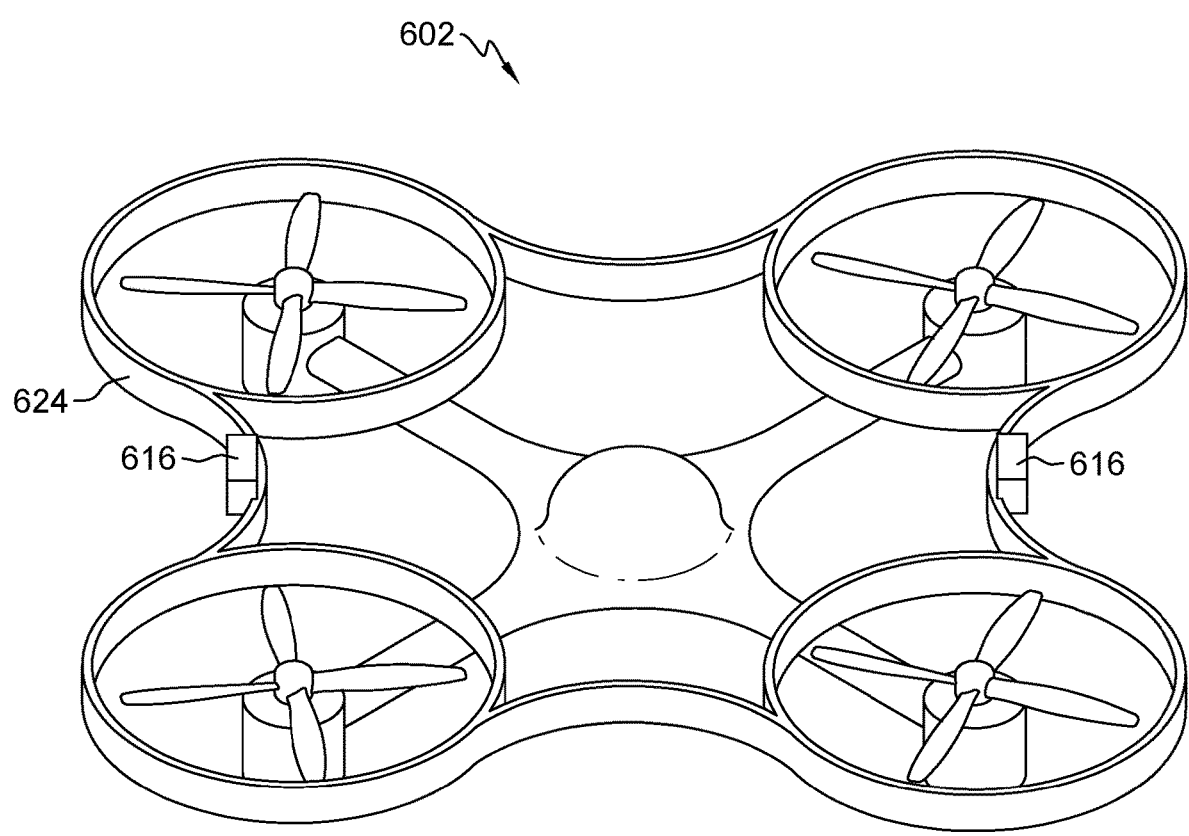
FIG. 6 depicts another example embodiment of an unmanned aerial vehicle in accordance with aspects described herein.

FIG. 6 depicts another example embodiment of an unmanned aerial vehicle in accordance with aspects described herein. The UAV 602 is similar to the UAVs of FIGS. 2-5 except that UAV 602 is provided with a propeller guard 624 that surrounds the propellers. This provides protection for the propellers and also additional potential mount-points for the coupling portion(s) that engage with connector(s) of a counterpart UAV. Here, coupling portions 616 are magnets provided on opposite edges of the propeller guard 624, instead of on the screen housing as in FIGS. 2-5. The magnets 616 are aligned with connectors provided on the free end of a counterpart UAV so that the UAV 602 can magnetically engage with the connectors of the counterpart UAV to pull and extend its flexible screen. The flexible screen and screen housing of UAV 602 is not shown in FIG. 6, though it could be mounted on an underside of UAV 602 as in FIGS. 2-5.

Figure 7:
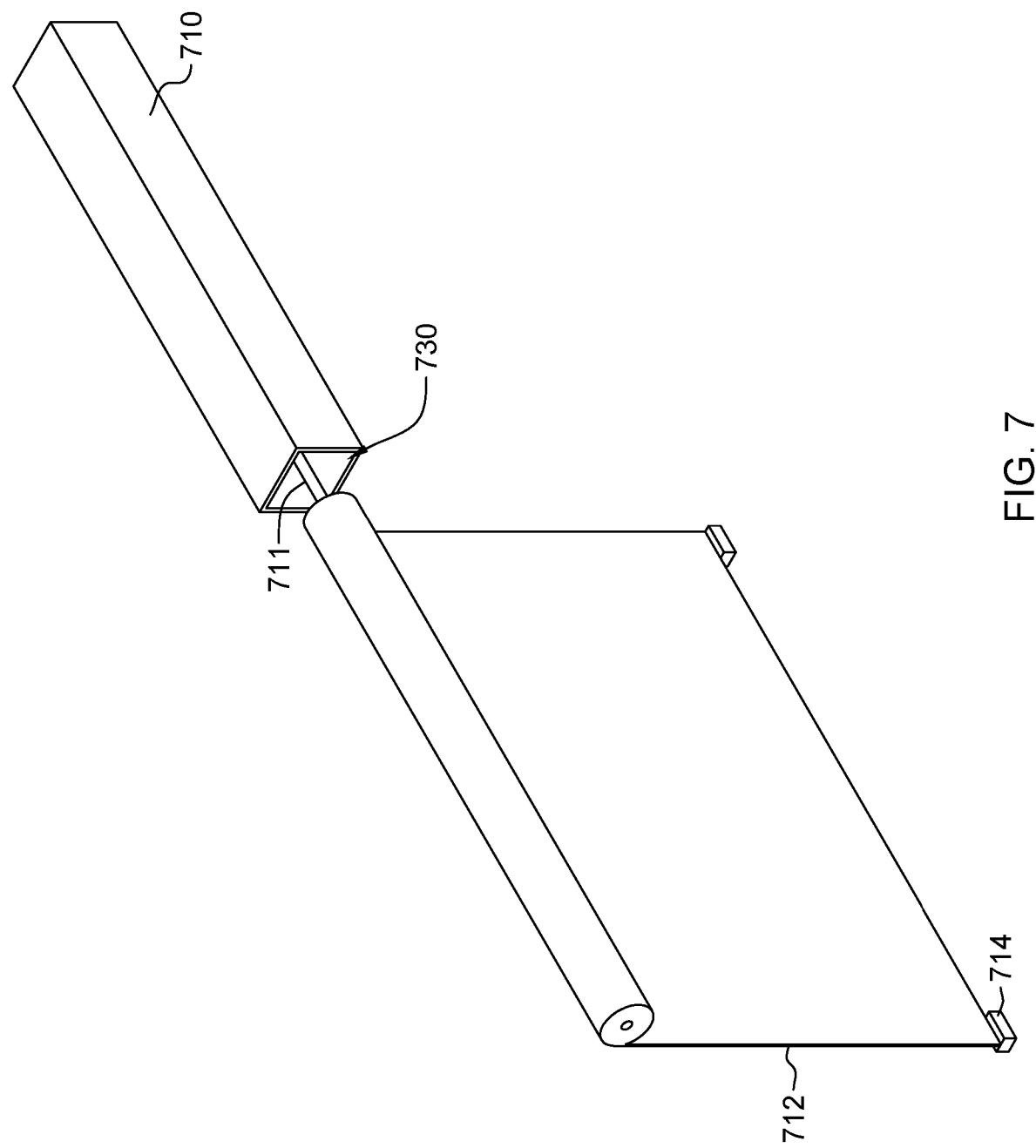
FIG. 7 depicts another example embodiment of a flexible screen and housing in accordance with aspects described herein.

FIG. 7 depicts another example embodiment of a flexible screen and housing in accordance with aspects described herein. In this example, the rolled screen and axle can be pivoted out from one end of the housing and then the flexible screen extended. Housing 710 encompasses an axle 711 that pivots, extends, or telescopes outward from one end 730 of housing 710. This deploys a rolled flexible screen on the axle from the end 730 the housing 710, which can be extended as described above and as shown by 712 in FIG. 7 by coupling connectors 714 to another UAV. Upon retraction of flexible screen 712 to furl or roll the flexible screen around the central axle 711, the rolled screen can then be moved back into housing 710 by drawing in axle 711. The embodiment of FIG. 7 has an advantage in it allows more flexibility in the positioning of the housing 710 of the UAV. Deployment of the rolled screen away from the housing, and therefore the UAV, prior to extension of the screen means the extended screen may be less likely to interfere with the aerodynamics of the UAV or other UAVs in flight.

Figure 8:
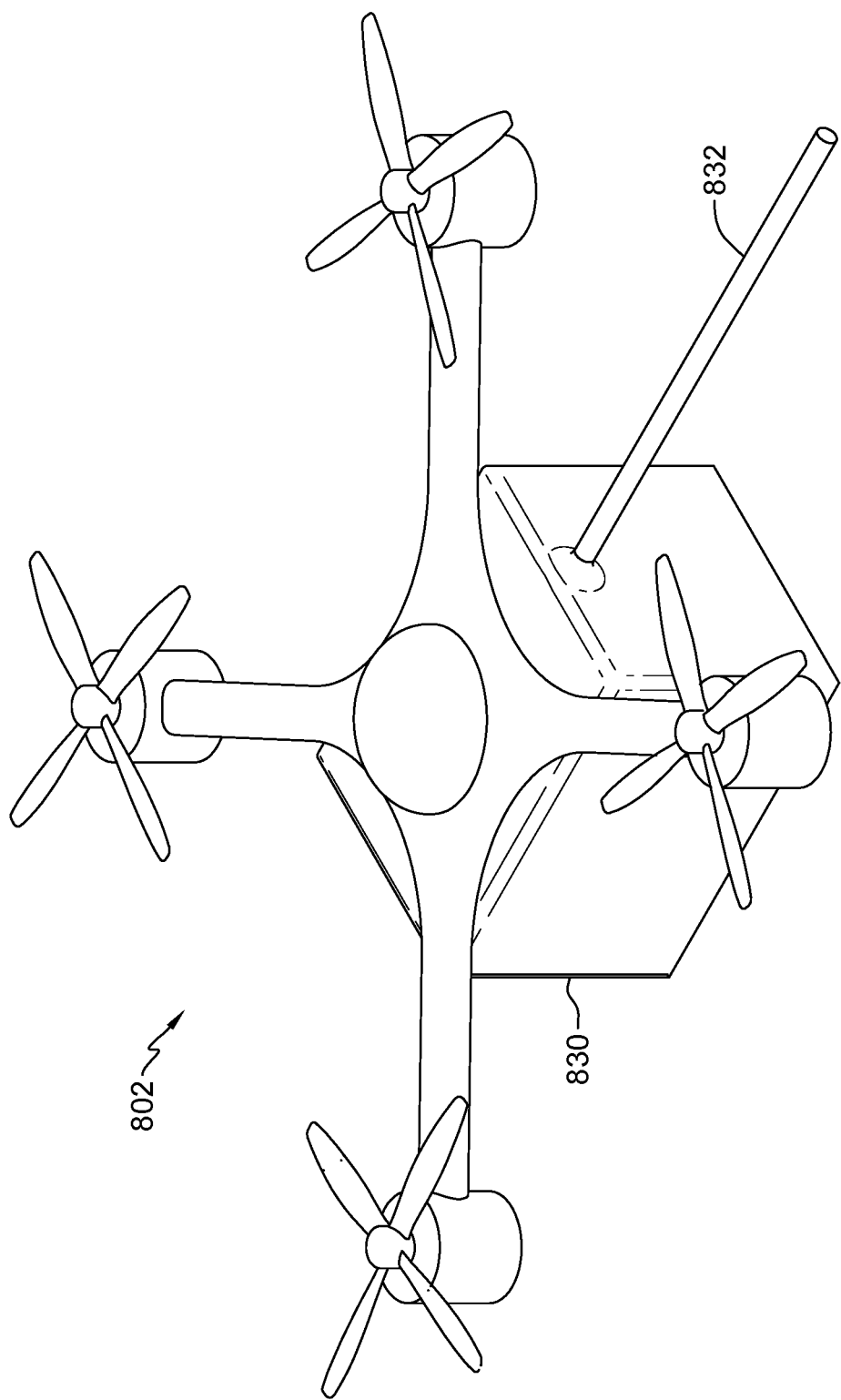
FIG. 8 depicts an example embodiment of an unmanned aerial vehicle for group control in accordance with aspects described herein.

FIG. 8 depicts an example embodiment of an unmanned aerial vehicle for group control in accordance with aspects described herein. The UAV 802 of FIG. 8 provides additional details of a group control UAV. UAV 802 is again a quadcopter and can include some components described above with reference to FIGS. 1-7. Instead of a housing and flexible screen as in prior-described embodiments of a UAV (see FIGS. 2-7), UAV 802 includes a heavy-duty battery pack 830 (or other desired power supply) coupled to an electrical conducting lead 832. The lead 832 is configured to electrically couple with contact(s) of other UAV(s), for instance a group UAV, to provide power thereto. The power could charge a battery of that UAV, power the UAV, and/or could be conducted to other UAVs as part of a chain of UAVs.

The UAV 802 can include different circuits of differing purposes. One such circuit, a first circuit, can function to govern the rotor speed of UAV 802, monitor the internal power supply of UAV 802, and receive commands from a second circuit of the UAV 802. A second circuit can be a control circuit implemented, in some embodiments, using hardware of a standard mobile smartphone or tablet device with GPS and other communication hardware. The control circuit can be powered by the heavy-duty battery 830 and have a primary function of governing the connection/communication of the group of UAVs to the cloud. In a specific example, the control circuit is connected to the first circuit, an RFID scanner/interrogator, a multi-UAV transceiver or other communication device, and the internal power supply.

The main battery pack (830) can function as a power source for powering and/or recharging group UAVs via lead 832. Such a power source could additionally or alternatively be implemented using other hardware, for instance solar panel(s). In this regard, the group control UAV 802 could include or couple to solar panels, for instance ones that the UAV 802 deploys or panel(s) that are already deployed at a site. Additionally or alternatively, though not shown, the UAV 802 can be adapted to couple with a power source, such as a power dock or standard electrical receptacle, and draw power therefrom for charging the battery 830, if present, or the internal battery of UAV 802, and/or for powering UAVs of a group via lead 832.

Figure 9:
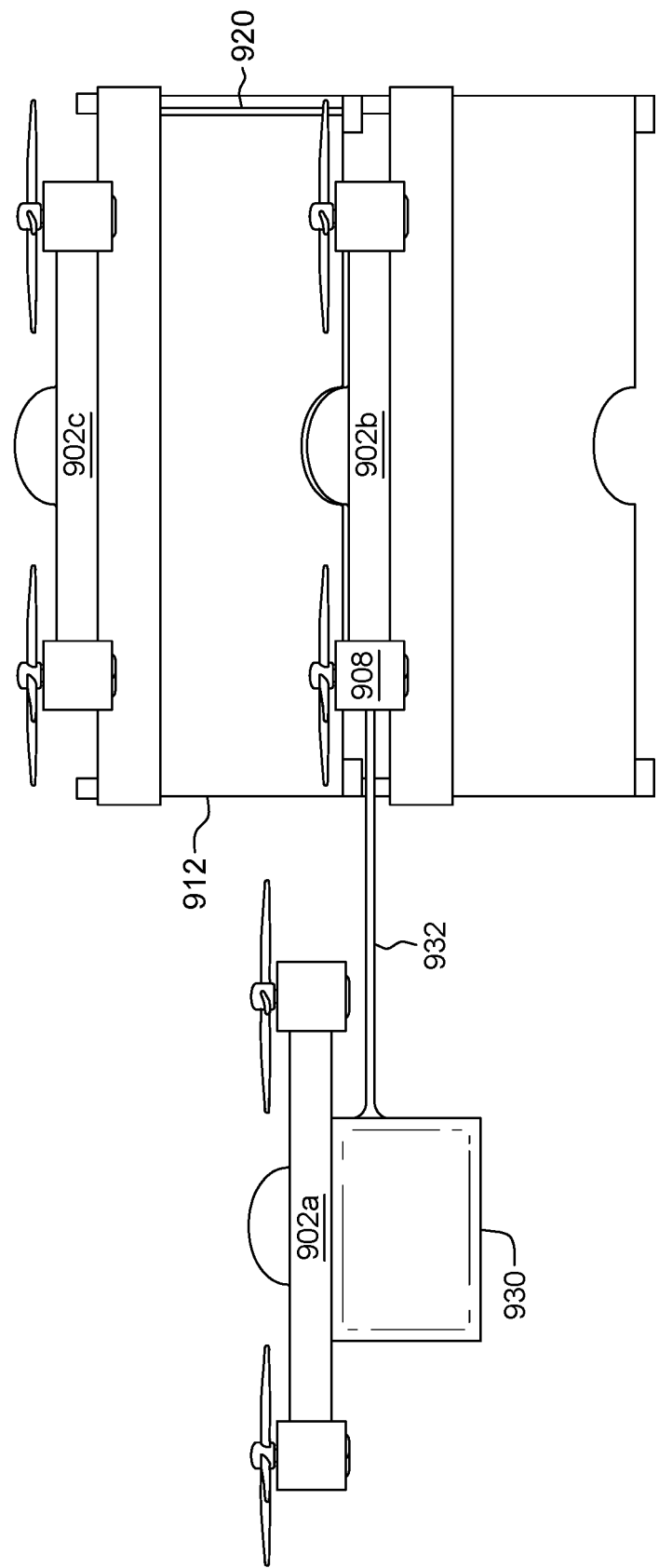
FIG. 9 depicts an example of power delivery to coupled unmanned aerial vehicles in accordance with aspects described herein.

FIG. 9 depicts an example of power delivery to coupled unmanned aerial vehicles in accordance with aspects described herein. Group control UAV 902*a* with battery pack 930 hovers adjacent group UAV 902*b* such that electrical lead 932 makes contact with electrical contact(s) (not pictured) on arm 908 of UAV 902*b*. UAV 902*b* is magnetically coupled to UAV 902*c* via magnets as shown in order to unfurl flexible screen 912 of UAV 902*c*.

The electrical contact(s) on arm 908 are coupled to a power supply of UAV 902*b*, which is coupled to contact(s) positioned and configured to engage with corresponding contacts of UAV 902*c* for provision of power through those contacts to electrical conductor 920 of flexible screen 912 and to a power supply of UAV 902*c*. In this manner, the group control UAV 902*a* powers UAV 902*b* and also UAV 902*c* via UAV 902*b*. Though not shown, UAV 902*a* may be connected via a power lead to another power source (in addition to battery 930) from which power is drawn and provided to the group UAVs. Alternatively, another group control UAV carrying a charged battery pack could deploy to the location to either replace the existing group control UAV when its battery is depleted or to swap the charged battery out for the existing battery when it is depleted.

Software running on external cloud server(s) can be accessible by a user via software executing on user devices. Example such software is a mobile application ("app") executing on a user mobile device. An example app presents a graphical user interface (GUI) enabling the user to choose from a selection of shapes and sizes for the structure/display-surfaces as described above. It can also provide a selectable emergency button, enabling the user to select a structure for rapid deployment to/around a selected object at a location. This can be useful in emergency situations when a structure is desperately needed. For instance, a user who identifies a hazard in a factory environment can use the emergency button to rapidly deploy a small structure around the hazard. A request for such a structure can be prioritized in situations when UAV availability is low given other requests for structures.

In any case, once the user makes the appropriate selections for a structure, the user can be prompted to provide payment information if not already saved in a user profile or account for the service. The payment information may be encrypted. In a specific embodiment, the user confirms the purchase of a temporary structure, then the user's device bundles and transmits a digital request with GPS data from the user's device along with information indicating selected properties of the structure, such as shape and size, and the encrypted payment details. The user software and/or cloud software possesses a list of GPS coordinates for all known UAV depots. If no depot having the proper resources (e.g. enough UAVs) to satisfy the request is close enough to the requested geographic location for the structure, then the request may be rejected and the user notified. Assuming the request is accepted and the requested structure provided, the digital request is handled by the counterpart software running in the cloud and processed to direct UAV deployment and structure formation at the user's selected location, as described herein.

The cloud software can include a database component with a list of group-UAV and group control UAV identifiers (IDs) and locations, an accounting component with the ability to securely store a user's data and bill the user periodically and/or immediately for using the service, and a request handling component for receiving and validating requests, starting and ending service charges, channeling the user's data into the database and/or accounting components, and passing the relevant request details, such as location and UAV IDs of the group UAVs assigned to service the request, to a next available group control UAV via a mobile/cellular/satellite network. Based on a required or requested change in structural shape or size that requires additional UAVs, an existing group control UAV and the swam UAVs controlled thereby can hold their positions until a next group control UAV departs from an originating depot and escorts the additional assigned group UAVs to the designated location of the structure, at which point the IDs of the additional group UAVs can be transferred from the escorting group control UAV to the local group control UAV. The local group control UAV takes over command of the escorted group UAVs to incorporate them into the existing group at the location, while the escorting group control UAV is instructed to return to the originating depot.

The cloud-based software and the user software or 'app' is the manner by which the user and the service provider can collectively govern the overall actions of the cloud to request and deploy UAV units. Fine-grained control over group UAVs, for instance how fast they move, the maneuvers they make for collision avoidance, their actions to unfurl flexible screens of other UAVs, etc. may be left to the local group control UAV and/or the group UAVs themselves, in some examples.

Returning to an earlier example in which a change of focus necessitates that a display of information (for instance an advertisement billboard) is to be changed or modified, in accordance with aspects described herein a marketing staffer finds a suitable, updated digital advertisement in JPEG or other format on a mobile device, uses the mobile application to engage with the cloud service, and orders a 10-UAV structure forming a large billboard-sized rectangle. The flexible screens are active displays that can display segments pieces of the digital advertisement. The advertisement is uploaded to the cloud service, which pushes the advertisement down to a group control UAV. In a matter of minutes, a group of UAVs and the group control UAV arrives and the group UAVs couple together and expand each other's flexible screens to form the billboard. The digital advertisement is displayed in large-scale across the extended flexible screens of the group UAVs forming the structure.

By way of another specific example of the use of features described herein, assume a user urgently requires an outdoor covering to cover a recently-delivered important piece of equipment that requires a temperature-controlled environment. The equipment is exposed to dropping temperatures and windy conditions. Needing an emergency covering for the equipment, the user interacts with a mobile app on the user's smartphone and selects an emergency button (graphical element) of the app. The app automatically acquires the user's location by leveraging the smartphone's GPS receiver, obtains payment information from the device or user directly, identifies a UAV depot within range, and transmits an appropriate request to a cloud facility. Software of the cloud facility identifies an available group control UAV at the identified UAV depot and processes the payment after verifying the group control UAV's availability. The cloud software sends messages to the group control UAV via that group control UAV's communication facilities, for instance an onboard mobile phone or controller circuit, providing to it the ID numbers of specific group UAVs, along with an 'emergency pod' shape configuration for the group, i.e. a structure of predefined size for at least partially surrounding an object. The group control UAV instructs the group UAVs to ascend and uses its RFID reader to track the positions of the group UAVs continuously to provide individual movement or flight corrections to avoid collision, while also ensuring proximity. The group control UAV accompanies the group UAVs to the provided location of the user, as determined by the GPS radio of the user's smartphone. Upon arrival, the group control UAV uses its multi-UAV transceiver to direct the group UAVs to form the pod shape around the equipment, using its RFID reader to ensure all of the group UAVs are in correct positions relative to each other, and using the user's smartphone GPS data and/or input from the user to identify where the pod is to be constructed.

The group control UAV can locally analyze proximity data from individual group UAVs and react by instructing movement of the group UAVs in order to prevent collisions as between themselves or with any other objects (terrain, objects, etc.). Additionally or alternatively, the individual group UAVs can have some intelligence to avoid nearby objects. The proximity of the UAVs to each other allow their magnets to engage and copper wires to link their power supplies to create a power network. The group control UAV moves to a nearest group UAV and sets down on the ground, positioning the electrical lead from its heavy-duty battery close enough to the group UAV that power can be transferred thereto. This allows the group control UAV's heavy-duty battery to power the group over an extended period of time.

The constructed covering protects the equipment from adverse environmental conditions such as wind, precipitation, cold, and wildlife. The structure can enclose the equipment so that the user can heat the inside of the covering if necessary.

Thus various unmanned aerial vehicles are disclosed in accordance with aspects described herein. A group UAV can include, for example, a flexible screen coupled to a retraction device, with the flexible screen being retractable, by the retraction device, from an extended position, in which the flexible screen extends in a direction from the UAV, to a retracted position. The retracted position in some embodiments includes a rolled position, in which the flexible screen is rolled, and the extended position includes an unrolled position, in which the flexible screen is at least partially unrolled from the rolled position. The retraction device can be biased to pull the flexible screen into the rolled position, but the bias can be overcome when the end of the flexible screen is coupled to another UAV and the two UAVs move apart. The UAV can also include connector(s) at a free end of the flexible screen, with the connector(s) being configured for coupling to another UAV of a group of UAVs to move the flexible screen from the retracted position to the extended position based on relative movement between the UAV and the other UAV. Example such connectors are magnets on the end of the flexible screen for engaging with another UAV, though other types of connectors are possible. The UAV also includes a coupling portion or portions that is/are configured for engaging with connector(s) of another UAV of the group. A coupling portion refers to whatever portion of the UAV is to engage with connector(s) on the bottom of the flexible screen of another. In some examples, the connector(s) of a UAV include ferromagnetic contacts for magnetically engaging with another UAV hovering below, and the coupling portion(s) of the UAV include ferromagnetic material for magnetically engaging with connector(s) of yet another UAV hovering above. A coupling portion can include electromagnet(s) that can be selectively energized and thereby selectively produce a magnetic field and attract and engage with the connector(s) of the UAV above. In some examples, the flexible screen is at least partially contained within a housing into which the flexible screen rolls into the rolled position, and a coupling portion includes ferromagnetic material that is disposed on the housing and/or integrated into (e.g. at least partially embedded within) the housing.

The group UAV can also include a wireless network interface controller (Wi-Fi, Bluetooth, etc.) for local wireless network communication between the UAV and other UAVs of the group. Additionally, the group UAV can include a processing circuit in communication with a memory, where the memory stores program instructions for execution by the processing circuit to control operation of the UAV. Such operation can include wirelessly communicating with other UAV(s) in the group to facilitate coordinated positioning of the UAV within the group and coupling of the UAV to other UAVs of the group.

In embodiments in which the flexible screen is or includes an electronic visual display, the operation of the UAV can further include receiving directives to graphically display element(s) on the electronic visual display, and the graphically displaying the element(s) on the electronic visual display with the flexible screen in the extended position. Example such elements include digital images, though any graphical elements could be displayed as the flexible screens may be akin to computer displays and televisions.

In some embodiments, the group UAV further includes an electrical conductor that extends along the flexible screen, either running along with display or embedded within the display material, for instance. The electrical conductor can be coupled to a power supply of the UAV (to draw power therefrom or through the power supply) and a contact that is configured for electrically coupling with another UAV and conducting electricity from the UAV to the other UAV.

Additionally or alternatively, the free end of the flexible screen can have a contour that matches or conforms to a shape of another UAV to which the UAV may connected, i.e. where the free end is positioned when the connector(s) of the UAV are coupled to the other UAV's coupling portion(s).

In some embodiments, the wireless communicating performed by the UAV includes receiving control commands from a group control UAV, controlling movement and positioning the UAV in response to the received control commands. The control commands can command the UAV's positioning, movement, coupling to and decoupling from other UAVs, and other functioning.

The UAV can also include an active RFID tag that is coupled to a power supply dedicated to the active RFID tag. The RFID tag can include identification information that uniquely identifies the UAV to an RFID reader. Based on the RFID having a dedicated power supply, if the main power supply of the UAV is drained/depleted, the RFID tag can remain active for communicating with an RFID interrogator or receiver.

Figure 10:
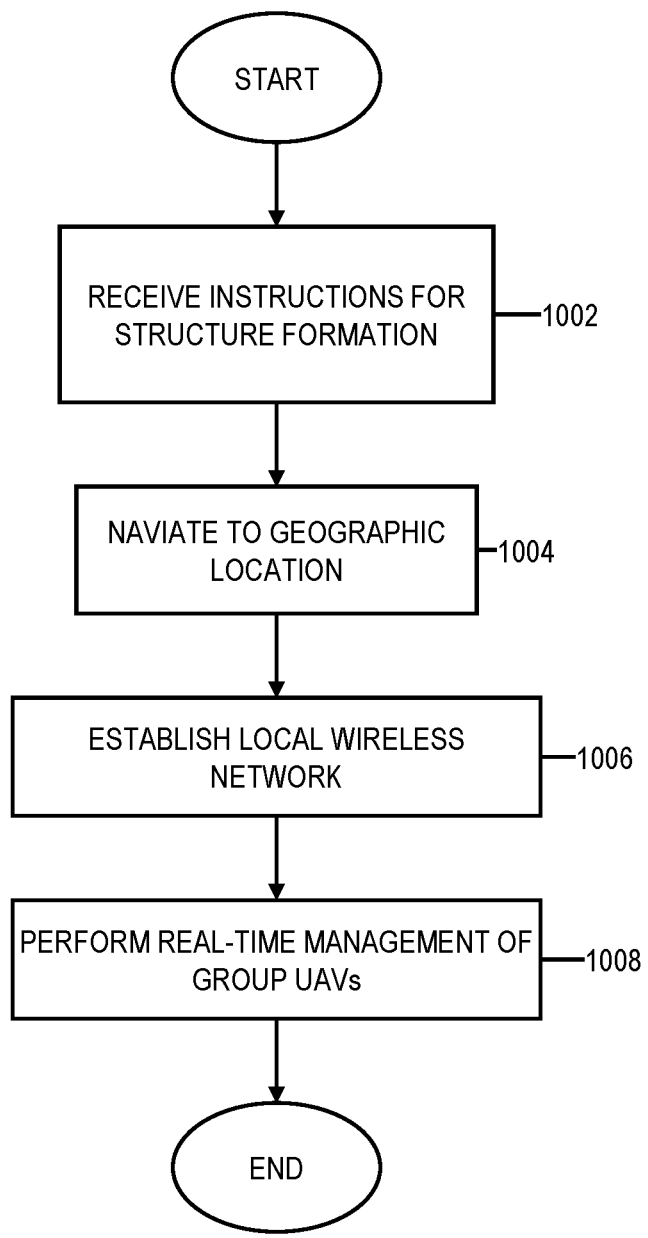
FIG. 10 depicts an example process performed by a group control unmanned aerial vehicle, in accordance with aspects described herein.

Additional aspects relating to group control UAVs are described. Such a UAV can include a power supply and an electrical conducting lead for powering one or more UAVs of a group of UAVs in-flight. The power supply can include a battery holding a charge, in which case powering the one or more UAVs can include providing power from the battery to the one or more UAVs via the electrical conducting lead. The UAV can also include a global positioning satellite (GPS) receiver and at least one communication device that includes a wireless network interface card and/or any hardware for a cellular or satellite mobile network connection, Bluetooth connection, or other wired or wireless connection. The UAV also includes a processing circuit in communication with a memory, where the memory stored program instructions for execution by the processing circuit to control operation of the UAV. This operation can include performing (referring to FIG. 10): receiving (1002) from an external server, such as a cloud server, instructions for formation of a structure out of at least some UAVs of the group at a geographic location, navigating (1004) to the geographic location based on GPS data obtained from the GPS receiver, establishing (1006), using the wireless network interface card, a local wireless network at the geographic location for wireless network communication between the group control UAV and UAVs of the group, and performing (1008) real-time management of the UAVs of the group in forming and maintaining a desired shape of the structure at the geographic location. The real-time management can include, as an example, wirelessly communicating with the UAVs of the group in providing control commands to the UAVs of the group to coordinate positioning and coupling together of the UAVs of the group in forming and maintaining the desired shape. The coupling together includes selective coupling of, and relative movement between, a plurality of the UAVs in the group to extend flexible screens of the UAVs to form at least a portion of the structure.

In some embodiments, the operation of the group control UAV further includes engaging with, and receiving power from, a dock at the geographic location. The powering the one or more UAVs can in this scenario include providing the power received from the dock to the one or more UAVs via the electrical conducting lead.

The real-time management performed by the group control UAV can further include performing sensor-based identification of locations of the UAVs of the group, for instance using camera(s), proximity sensor(s), RFID readers, etc., analyzing physical properties of the formed structure based on those locations, and communicating control commands to one or more UAVs of the group to dictate adjustments in location and/or functioning of the UAVs of the group. The dictated adjustments can include adjustments ascertained based on dynamically changing conditions of an environment at the geographic location, for instance. Example changing conditions include changes in weather, in which screens can be extended or repositioned to block wind or precipitation from entering the structure, or increase/decrease in the number of objects occupying the structure, in which group UAVs may be repositioned to adjust the shape and/or size of the structure given positions and number of objects inside, entering, or exiting, as examples.

In some examples, the group control UAV includes an RFID reader, and the sensor-based identification of locations of the UAVs of the group includes using the RFID reader to read RFID tags of the UAVs of the group to identify the locations of those UAVs in the group. The real-time management can further include basing at least some adjustments of the dictated adjustments on the locations identified by reading the RFID tags.

Thus, embodiments described herein present methods that can be performed by a group control UAV. For instance, the group control UAV can receive from an external server instructions for formation of a structure out of group UAVs at a geographic location, and navigate to the geographic location based on GPS data obtained from a global positioning satellite (GPS) receiver of the group control UAV. The group control UAV can establish, using a wireless network interface card of the group control UAV, a local wireless network at the geographic location for wireless network communication between the group control UAV and the group UAVs, and perform real-time management of the group UAVs in forming and maintaining a desired shape of the structure at the geographic location, the real-time management including wirelessly communicating with the group UAVs in providing control commands to the group UAVs to coordinate positioning and coupling together of the group UAVs in forming and maintaining the desired shape, the coupling together including selective coupling of, and relative movement between, a plurality of the group UAVs to extend flexible screens of the plurality of group UAVs to form at least a portion of the structure.

Additionally, the method can include powering one or more of the group UAVs in-flight using a power supply and an electrical conducting lead of the group control UAV, the power supply including a battery holding a charge, where the powering the one or more UAVs includes providing power from the battery to the one or more UAVs via the electrical conducting lead. Additionally or alternatively, the method can include engaging with, and receiving power from, a dock at the geographic location, and powering one or more UAVs of the group UAVs in-flight, the powering including providing the power received from the dock to the one or more UAVs via an electrical conducting lead.

In some aspects, the real-time management can additionally include performing sensor-based identification of locations of the group UAVs; analyzing physical properties of the formed structure based on the locations; and communicating control commands to at least one UAV of the group UAVs to dictate adjustments in location and/or functioning of the at least one UAV of the group, where the dictated adjustments include adjustments ascertained based on dynamically changing conditions of an environment at the geographic location.

A UAV can be or include a computer system for performing aspects described herein. In this regard, a UAV can have an onboard computer system that includes at least a processing circuit and memory with instructions for execution to cause the UAV to perform UAV functions as described herein. In another sense, the UAV itself can be regarded as a computer system— a specialized computer system having components such as those described above (including, for instance, propeller(s), motor(s), battery pack(s), etc.).

Although various examples are provided, variations are possible without departing from a spirit of the claimed aspects.

Accordingly, processes described herein may be performed singly or collectively by one or more computer systems, such as one or more UAVs or computer system(s) provided as part thereof, or one or more internet-connected servers such as cloud servers, as examples. FIG. 6 depicts one example of a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

Figure 11:
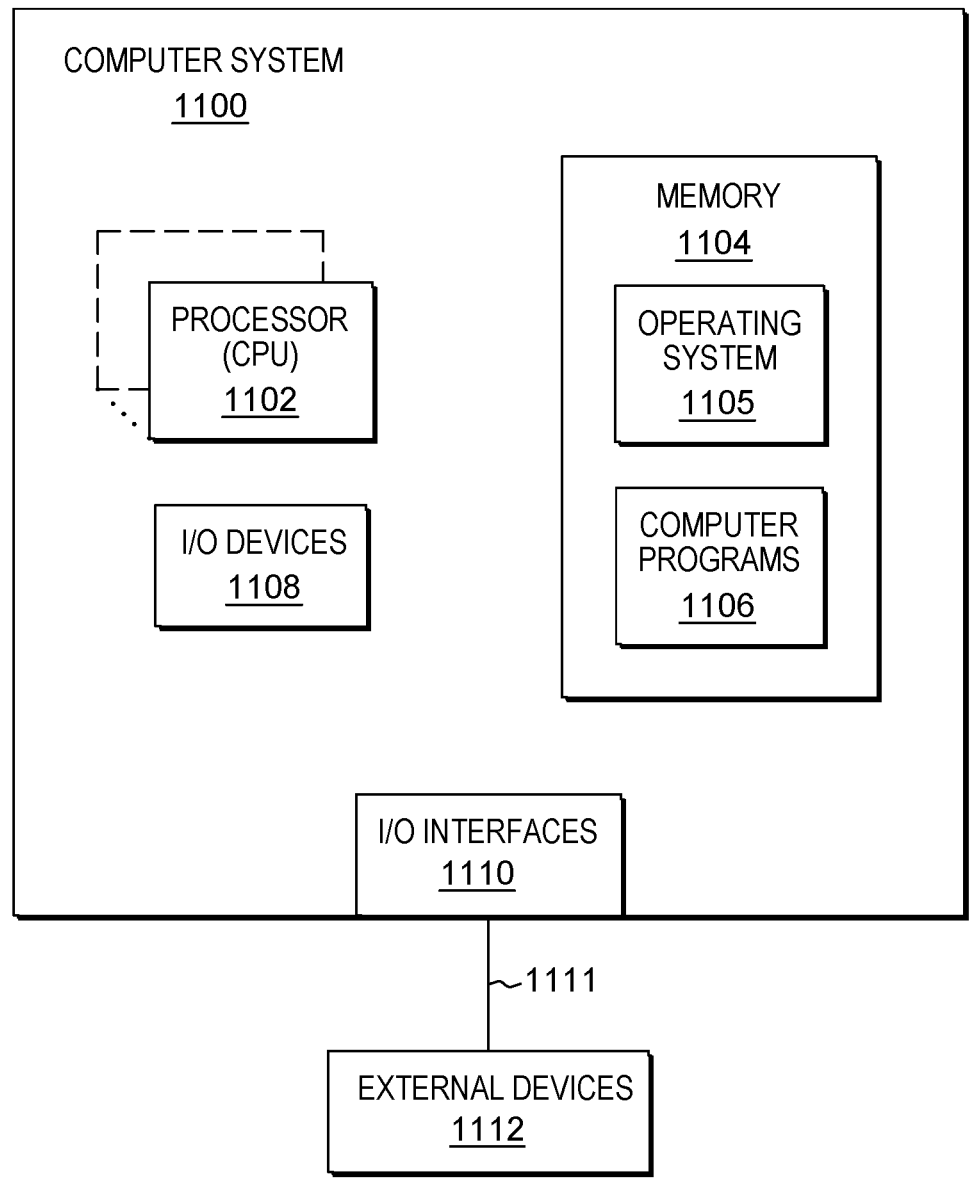
FIG. 11 depicts one example of a computer system and associated devices to incorporate and/or use aspects described herein.

FIG. 11 shows a computer system 1100 in communication with external device(s) 1112. Computer system 1100 includes one or more processor(s) 1102, for instance central processing unit(s) (CPUs) and sometimes referred to as processing circuit(s). A processor can include functional components used in the execution of instructions, such as functional components to fetch program instructions from locations such as cache or main memory, decode program instructions, and execute program instructions, access memory for instruction execution, and write results of the executed instructions. A processor 1102 can also include register(s) to be used by one or more of the functional components. Computer system 1100 also includes memory 1104, input/output (I/O) devices 1108, and I/O interfaces 1110, which may be coupled to processor(s) 1102 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1004 can be or include main or system memory (e.g. Random Access Memory) used in the execution of program instructions, storage device(s) such as hard drive(s), flash media, or optical media as examples, and/or cache memory, as examples. Memory 1104 can include, for instance, a cache, such as a shared cache, which may be coupled to local caches (examples include L1 cache, L2 cache, etc.) of processor(s) 1102. Additionally, memory 1104 may be or include at least one computer program product having a set (e.g., at least one) of program modules, instructions, code, or the like that is/are configured to carry out functions of embodiments described herein when executed by one or more processors.

Memory 1104 can store an operating system 1105 and other computer programs 1106, such as one or more computer programs/applications that execute to perform aspects described herein. Specifically, programs/applications can include computer readable program instructions that may be configured to carry out functions of embodiments of aspects described herein.

Examples of I/O devices 1108 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1112) coupled to the computer system through one or more I/O interfaces 1110.

Computer system 1100 may communicate with one or more external devices 1112 via one or more I/O interfaces 1110. Example external devices include a keyboard, a pointing device, a display, and/or any other devices that enable a user to interact with computer system 1100. Other example external devices include any device that enables computer system 1100 to communicate with one or more other computing systems or peripheral devices such as a printer. A network interface/adapter is an example I/O interface that enables computer system 1100 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 1110 and external devices 1112 can occur across wired and/or wireless communications link(s) 1111, such as Ethernet-based wired or wireless connections. Example wireless connections include cellular, satellite, Wi-Fi, Bluetooth®, proximity-based, near-field, or other types of wireless connections. More generally, communications link(s) 1111 may be any appropriate wireless and/or wired communication link(s) for communicating data.

Particular external device(s) 1112 may include one or more data storage devices, which may store one or more programs, one or more computer readable program instructions, and/or data, etc. Computer system 1100 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. Particular external device(s) 1112 may additionally or alternatively include cloud servers and UAVs as described herein.

Computer system 1100 may be operational with numerous other general purpose or special purpose computing system environments or configurations. Computer system 1100 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), human-operated, semi-autonomous, autonomous or unmanned aerial and other forms of vehicles, mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
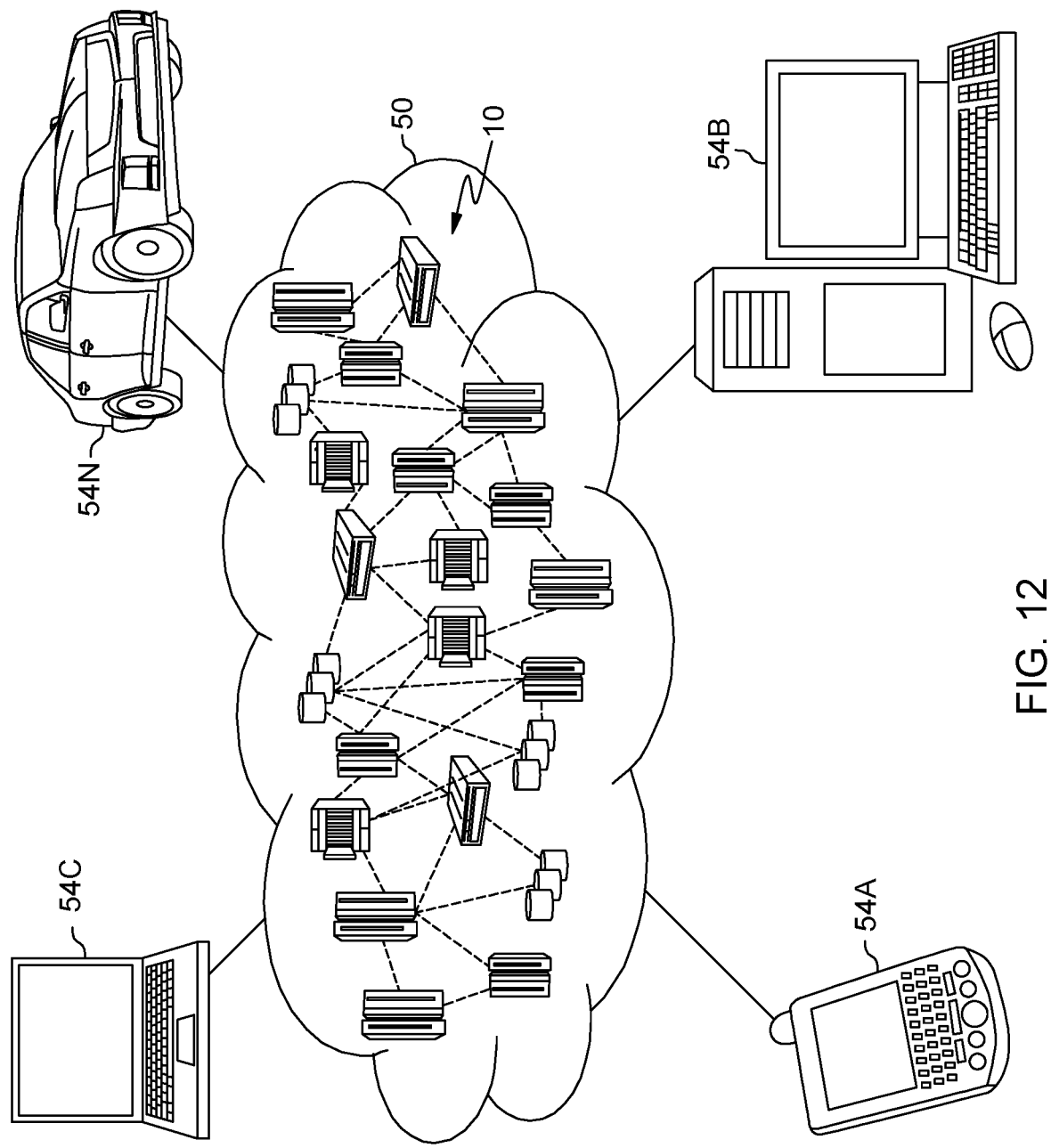
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Other example such cloud consumers are UAVs. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
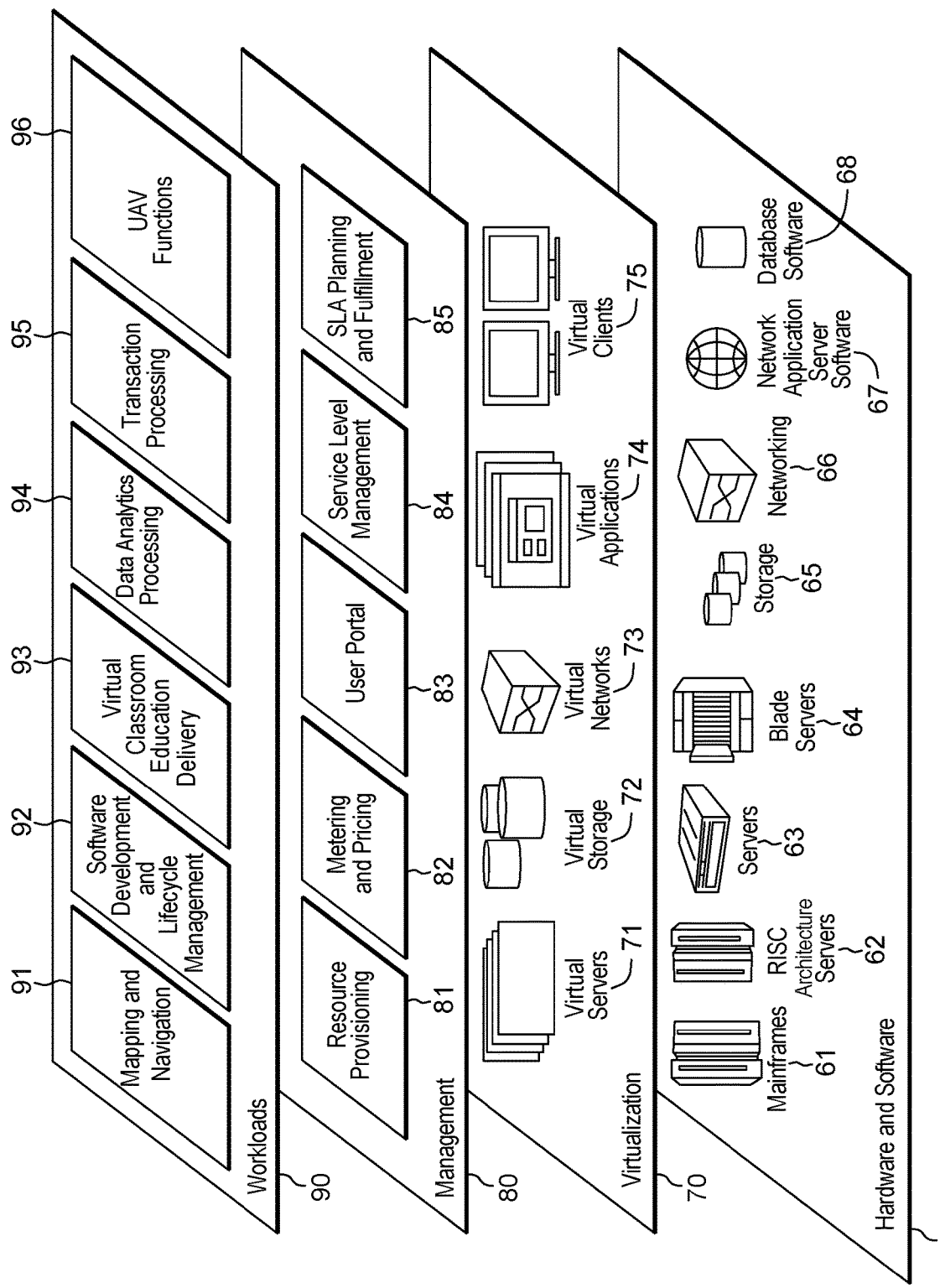
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and UAV functions 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions D-2 Oct. 27, 2020 by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. An unmanned aerial vehicle (UAV) comprising:
a flexible screen coupled to a retraction device, the flexible screen being retractable, by the retraction device, from an extended position, in which the flexible screen extends in a direction from the UAV, to a retracted position;

one or more connectors at a free end of the flexible screen, the one or more connectors configured for coupling to a screen housing of a first other UAV of a group of UAVs to move the flexible screen from the retracted position to the extended position based on relative movement between the UAV and the first other UAV;

a coupling portion configured for engaging with at least one connector of a second other UAV of the group;

a wireless network interface controller for local wireless network communication between the UAV and UAVs of the group; and a processing circuit in communication with a memory, the memory storing program instructions for execution by the processing circuit to control operation of the UAV to perform wireless communicating with one or more other UAVs in the group to facilitate coordinated positioning of the UAV within the group and coupling of the UAV to the first other UAV and the second other UAV.

2. The UAV of claim 1, wherein the retracted position comprises a rolled position, in which the flexible screen is rolled, and the extended position comprises an unrolled position, in which the flexible screen is at least partially unrolled from the rolled position, wherein the retraction device is biased to pull the flexible screen into the rolled position.

3. The UAV of claim 2, wherein the flexible screen is at least partially contained within a screen housing of the UAV and the flexible screen rolls into the rolled position in the screen housing of the UAV, and wherein the coupling portion comprises ferromagnetic material that is at least one of the group consisting of: disposed on the screen housing of the UAV, and integrated into the screen housing of the UAV.

4. The UAV of claim 1, wherein the flexible screen comprises an electronic visual display, and wherein the operation of the UAV further comprises receiving directives to graphically display one or more elements on the electronic visual display, and graphically displaying the one or more elements on the electronic visual display with the flexible screen in the extended position.

5. The UAV of claim 1, further comprising an electrical conductor that extends along the flexible display, the electrical conductor coupled to a power supply of the UAV and a contact configured for electrically coupling with the first other UAV and conducting electricity from the UAV to the first other UAV.

6. The UAV of claim 1, wherein the free end of the flexible screen has a contour conforming to a shape of the first other UAV where the free end is positioned based on the one or more connectors of the UAV being coupled to the first other UAV.

7. The UAV of claim 1, wherein the one or more connectors comprises ferromagnetic contacts for magnetically engaging with the first other UAV, and wherein the coupling portion comprises ferromagnetic material for magnetically engaging with the at least one connector of the second other UAV.

8. The UAV of claim 7, wherein the coupling portion comprises one or more electromagnets configured to selectively produce a magnetic field and attract and engage with the at least one connector of the second other UAV.

9. The UAV of claim 1, wherein the wireless communicating comprises receiving control commands from a group control UAV, different from the UAVs of the group, and controlling movement and positioning the UAV in response to the received control commands.

10. The UAV of claim 1, further comprising an active RFID tag coupled to a power supply dedicated to the active RFID tag, the RFID tag comprising identification information that uniquely identifies the UAV to an RFID reader.

11. An unmanned aerial vehicle (UAV) comprising:

a power supply and an electrical conducting lead for powering one or more UAVs of a group of UAVs in-flight;

a global positioning satellite (GPS) receiver;

at least one communication device, comprising a wireless network interface card; and a processing circuit in communication with a memory, the memory storing program instructions for execution by the processing circuit to control operation of the UAV to perform:

receiving from an external server instructions for formation of a structure out of the UAVs of the group at a geographic location;

navigating to the geographic location based on GPS data obtained from the GPS receiver;

establishing, using the wireless network interface card, a local wireless network at the geographic location for wireless network communication between the UAV and the UAVs of the group; and performing real-time management of the UAVs of the group in forming and maintaining a desired shape of the structure at the geographic location, the real-time management comprising wirelessly communicating with the UAVs of the group in providing control commands to the UAVs of the group to coordinate positioning and coupling together of the UAVs of the group in forming and maintaining the desired shape, the coupling together comprising selective coupling of, and relative movement between, a plurality of the UAVs to extend flexible screens of the plurality of UAVs to form at least a portion of the structure, in which each flexible screen is of a respective first UAV of the plurality of UAVs and has a respective one or more connectors at a free end thereof that are configured for coupling to a screen housing of a respective second UAV of the plurality of UAVs to move the flexible screen from a retracted position to an extended position based on relative movement between the first UAV and the second UAV.

12. The UAV of claim 11, wherein the power supply comprises a battery holding a charge, and wherein the powering the one or more UAVs comprises providing power from the battery to the one or more UAVs via the electrical conducting lead.

13. The UAV of claim 11, wherein the operation of the UAV further comprises engaging with, and receiving power from, a dock at the geographic location, and wherein the powering the one or more UAVs comprises providing the power received from the dock to the one or more UAVs via the electrical conducting lead.

14. The UAV of claim 11, wherein the real-time management further comprises:

performing sensor-based identification of locations of the UAVs of the group;

analyzing physical properties of the formed structure based on the locations; and communicating control commands to at least one UAV of the group to dictate adjustments in at least one of the group consisting of: location and functioning of the at least one UAV of the group.

15. The UAV of claim 14, wherein the dictated adjustments comprise adjustments ascertained based on dynamically changing conditions of an environment at the geographic location.

16. The UAV of claim 14, further comprising an RFID reader, wherein the sensor-based identification of locations of the UAVs of the group comprises using the RFID reader to read RFID tags of the UAVs of the group to identify the locations of the UAVs of the group, and wherein the real-time management further comprises basing at least some adjustments of the dictated adjustments on the locations identified by reading the RFID tags.

17. A computer-implemented method comprising:
receiving, by a group control unmanned aerial vehicle (UAV), from an external server, instructions for formation of a structure out of group UAVs at a geographic location;
navigating to the geographic location based on GPS data obtained from a global positioning satellite (GPS) receiver of the group control UAV;
establishing, using a wireless network interface card of the group control UAV, a local wireless network at the geographic location for wireless network communication between the group control UAV and the group UAVs; and
performing real-time management of the group UAVs in forming and maintaining a desired shape of the structure at the geographic location, the real-time management comprising wirelessly communicating with the group UAVs in providing control commands to the group UAVs to coordinate positioning and coupling flexible display screens of the group UAVs to screen housings of the group UAVs in forming and maintaining the desired shape, the coupling together comprising selective coupling of, and relative movement between, a plurality of the group UAVs to extend flexible display screens of the plurality of group UAVs to form at least a portion of the structure.

18. The method of claim 17, further comprising powering one or more of the group UAVs in-flight using a power supply and an electrical conducting lead of the group control UAV, the power supply comprising a battery holding a charge, and wherein the powering the one or more UAVs comprises providing power from the batter to the one or more UAVs via the electrical conducting lead.

19. The method of claim 17, further comprising engaging with, and receiving power from, a dock at the geographic location, and powering one or more UAVs of the group UAVs in-flight, the powering comprising providing the power received from the dock to the one or more UAVs via an electrical conducting lead.

20. The method of claim 17, wherein the real-time management further comprises:
performing sensor-based identification of locations of the group UAVs;
analyzing physical properties of the formed structure based on the locations; and
communicating control commands to at least one UAV of the group UAVs to dictate adjustments in at least one of the group consisting of: location and functioning of the at least one UAV of the group, wherein the dictated adjustments comprise adjustments ascertained based on dynamically changing conditions of an environment at the geographic location.

* * * * *